(12) United States Patent
Murayama

(10) Patent No.: US 9,183,793 B2
(45) Date of Patent: Nov. 10, 2015

(54) METHOD FOR DRIVING ELECTROPHORETIC DISPLAY APPARATUS, ELECTROPHORETIC DISPLAY APPARATUS, ELECTRONIC APPARATUS, AND ELECTRONIC TIMEPIECE

(71) Applicant: SEIKO EPSON CORPORATION, Tokyo (JP)

(72) Inventor: Tetsuro Murayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 14/361,990

(22) PCT Filed: Dec. 18, 2012

(86) PCT No.: PCT/JP2012/008074
§ 371 (c)(1),
(2) Date: May 30, 2014

(87) PCT Pub. No.: WO2013/094180
PCT Pub. Date: Jun. 27, 2013

(65) Prior Publication Data
US 2014/0320468 A1  Oct. 30, 2014

(30) Foreign Application Priority Data
Dec. 20, 2011 (JP) ................. 2011-278342

(51) Int. Cl.
*G09G 3/34* (2006.01)
*G09G 3/20* (2006.01)
(Continued)

(52) U.S. Cl.
CPC ............... *G09G 3/344* (2013.01); *G02F 1/167* (2013.01); *G09G 3/20* (2013.01); *G09G 3/34* (2013.01); *G09G 3/3406* (2013.01); *G09G 3/3611* (2013.01); *G09G 2300/043* (2013.01); *G09G 2300/0857* (2013.01); *G09G 2310/04* (2013.01); *G09G 2310/061* (2013.01); *G09G 2310/068* (2013.01); *G09G 2320/0204* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,639,580 B1 * | 10/2003 | Kishi et al. | G02F 1/167 345/105 |
| 7,012,600 B2 | 3/2006 | Zehner et al. | |

(Continued)

FOREIGN PATENT DOCUMENTS

| | | |
|---|---|---|
| JP | 2005-530201 A | 10/2005 |
| JP | 2007-505350 A | 3/2007 |

(Continued)

*Primary Examiner* — Linh N Hoffner
(74) *Attorney, Agent, or Firm* — Global IP Counselors, LLP

(57) ABSTRACT

An electrophoretic display apparatus driving method that allows DC balance to be achieved and reduces variations in size and color tone of a displayed image that may occur in a partial-screen drive method and related apparatus are provided. The drive method includes a first image display step (S2) of displaying a first image in a first color on a display section, a first image adjustment step (S3) of displaying a background of the first image in a second color, a first image deletion step (S4) of displaying the background of the first image in the first color, a second image display step (S12) of displaying a background of a second image in the second color, a second image adjustment step (S13) of displaying the second image in the first color, and a second image deletion step (S14) of displaying the second image in the second color.

7 Claims, 21 Drawing Sheets

(51) Int. Cl.
   *G09G 3/36* (2006.01)
   *G02F 1/167* (2006.01)
(52) U.S. Cl.
   CPC .............. *G09G2320/0233* (2013.01); *G09G 2320/0257* (2013.01)

(56) References Cited

U.S. PATENT DOCUMENTS

| | | |
|---|---|---|
| 8,081,155 B2 | 12/2011 | Kajino |
| 8,237,653 B2 | 8/2012 | Maeda et al. |
| 8,319,726 B2 | 11/2012 | Kajino |
| 2006/0238488 A1* | 10/2006 | Nihei et al. ............ G09G 1/167 345/107 |
| 2007/0070028 A1 | 3/2007 | Zhou et al. |
| 2007/0080926 A1 | 4/2007 | Zhou et al. |
| 2007/0080927 A1 | 4/2007 | Zhou et al. |
| 2008/0238867 A1* | 10/2008 | Maeda et al. .......... G09G 3/344 345/107 |
| 2009/0179923 A1* | 7/2009 | Amundson et al. .... G09G 3/344 345/690 |
| 2011/0115759 A1* | 5/2011 | Yamazaki ............. G09G 3/344 345/204 |
| 2011/0187756 A1* | 8/2011 | Ono ........................ G09G 5/10 345/690 |

FOREIGN PATENT DOCUMENTS

| | | |
|---|---|---|
| JP | 2007-512567 A | 5/2007 |
| JP | 2007-512571 A | 5/2007 |
| JP | 2009-258614 A | 11/2009 |
| JP | 2010-044397 A | 2/2010 |
| JP | 2010-181618 A | 8/2010 |
| JP | 2013-061592 A | 4/2013 |

* cited by examiner

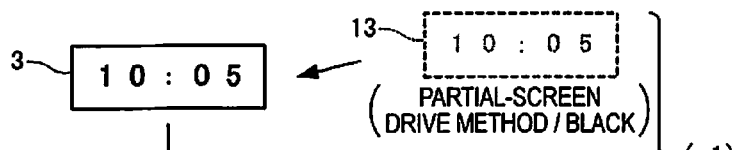
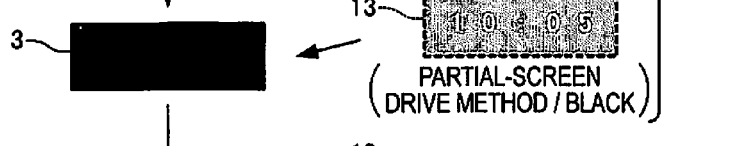
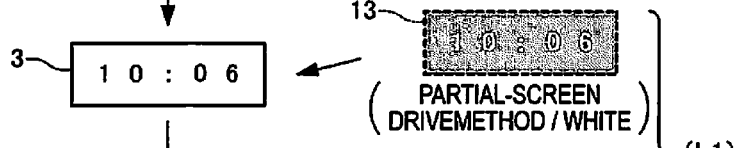
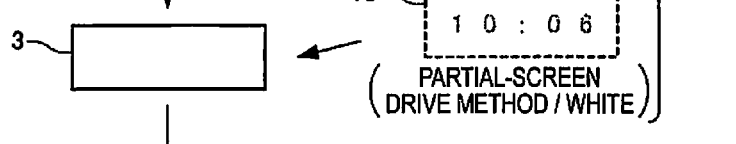
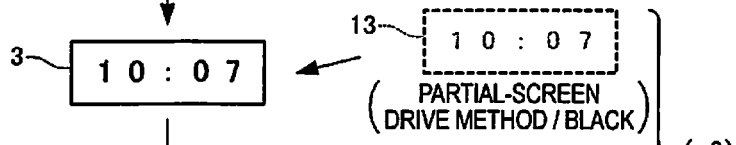
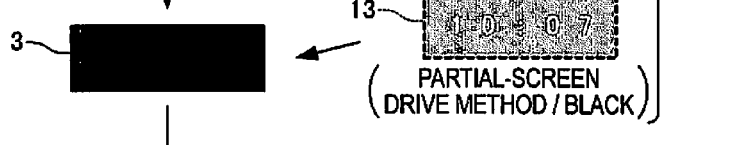
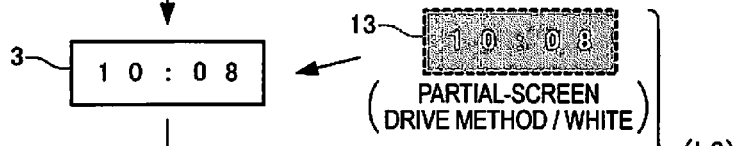
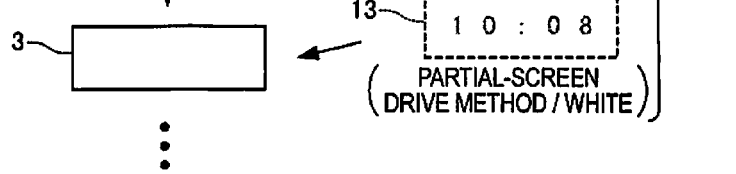

IDEALLY DISPLAYED IMAGE

DISPLAY IN BLACK AGAINST
PLAIN WHITE BACKGROUND

DISPLAY IN WHITE AGAINST
PLAIN BLACK BACKGROUND

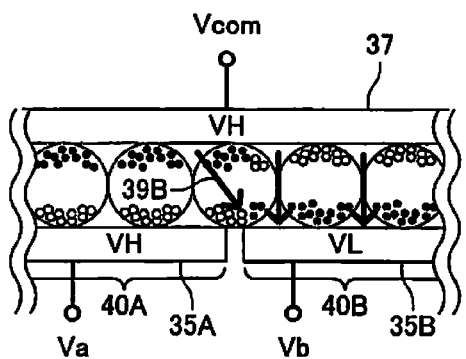
FIG.12
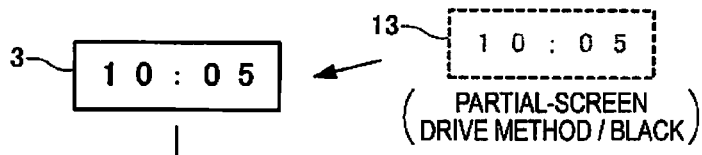
FIG.13A FIRST IMAGE DISPLAY STEP
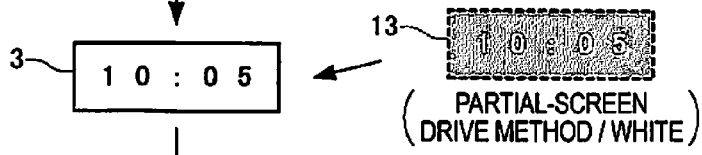
FIG.13B FIRST IMAGE ADJUSTMENT STEP
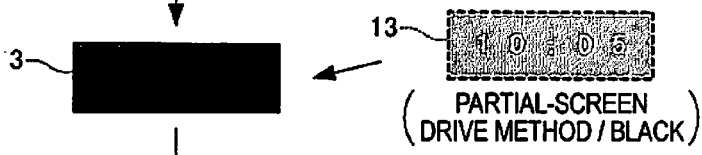
FIG.13C FIRST IMAGE DELETION STEP
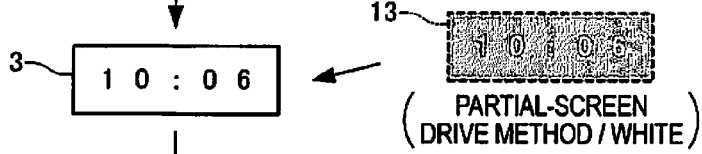
FIG.13D SECOND IMAGE DISPLAY STEP
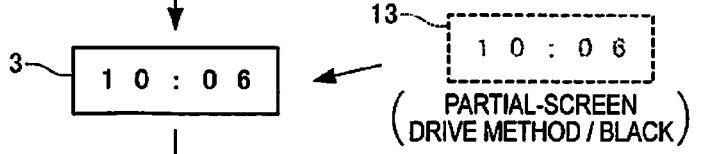
FIG.13E SECOND IMAGE ADJUSTMENT STEP
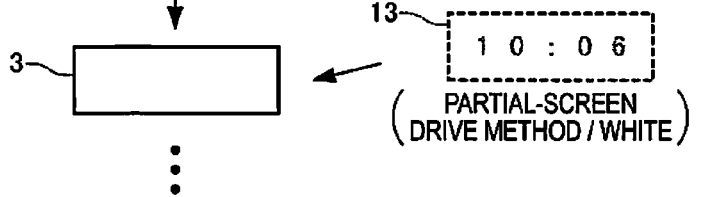
FIG.13F SECOND IMAGE DELETION STEP

FIRST IMAGE
DISPLAY STEP

FIRST IMAGE
ADJUSTMENT STEP

FIRST-IMAGE-
DELETION
FIRST STEP

FIRST-IMAGE-
DELETION
SECOND STEP

SECOND IMAGE
DISPLAY STEP

SECOND IMAGE
ADJUSTMENT STEP

SECOND-IMAGE-
DELETION
FIRST STEP

SECOND-IMAGE-
DELETION
SECOND STEP

METHOD FOR DRIVING ELECTROPHORETIC DISPLAY APPARATUS, ELECTROPHORETIC DISPLAY APPARATUS, ELECTRONIC APPARATUS, AND ELECTRONIC TIMEPIECE

CROSS REFERENCE TO RELATED APPLICATIONS

This application is a U.S. National stage application of international Application No. PCT/JP2012/008074, filed Dec. 18, 2012, which claims priority under to Japanese Patent Application No. 2011-278342 filed with Japan Patent Office on Dec. 20, 2011. The entire disclosure of Japanese Patent Application No. 2011-278342 is hereby incorporated herein by reference.

BACKGROUND

1. Field of the Invention

The present invention relates to a method for driving an electrophoretic display apparatus, an electrophoretic display apparatus, an electronic apparatus, an electronic timepiece, and other related apparatus and methods.

2. Background Information

In recent years, a display panel having a memory capability that can hold an image even when the display panel is powered off has been developed and used in an electronic timepiece and other apparatus. Known examples of the display panel having a memory capability include an EPD (electrophoretic display) and a memory-capable liquid crystal apparatus.

An electrophoretic display apparatus has excellent advantages, such as a wide angular field of view, a high contrast ratio, high flexibility, and low power consumption because an electrophoretic display apparatus is a reflective display.

On the other hand, as described in JP-T-2005-530201 (Patent Literature 1), the operating life of an electrophoretic display apparatus may be shortened if the time average of an electric field applied between electrodes in the apparatus is not nearly zero. That is, to ensure long-time reliability of an electrophoretic display apparatus, it is necessary to achieve DC balance or to make the time average of the applied electric field nearly zero.

SUMMARY

An electrophoretic display apparatus can display an image by using a full-screen drive method in which an entire display section is involved in drawing operation or a partial-screen drive method that also allows partial drawing of a portion to be redrawn. The display section of an electrophoretic display apparatus includes, for example, a pixel electrode corresponding to each pixel of an image and a transparent common electrode, and a voltage is applied to each of the electrodes to produce an electric field that moves an electrophoretic device for image update.

Drawing operation performed over the entire display section by always using the full-screen drive method takes a longer period to update a displayed image than in the partial-screen drive method. To overcome the problem, it is conceivable to primarily use the partial-screen drive method to shorten a drive period during which a signal used for voltage application is driven.

In the partial-screen drive method, however, in which only part of the display section is involved in drawing operation, the most recently driven color particles tend to spread due to an electric field in an oblique direction. Therefore, when an image is displayed, for example, by using the color of the most recently driven particles, the displayed image is likely to be visually recognized as a smeared image. On the other hand, when the background of an image is displayed, for example, by using the color of the most recently driven particles, the displayed image is likely to be visually recognized as a contracted image. That is, the partial-screen drive method is likely to cause step-dependent differences in the size and color tone of a displayed image (hereinafter referred to as variations in size and color tone).

The invention has been made in view of the problems described above. According to some aspects of the invention, an electrophoretic display apparatus driving method that not only allows DC balance to be achieved but also reduces variations in the size and color tone of a displayed image that may occur in the partial-screen drive method and other related apparatus are provided.

(1) An aspect of the invention relates to a method for driving an electrophoretic display apparatus including a display section configured to have the following components: a pair of substrates that sandwich an electrophoretic device containing electrophoretic particles; pixels capable of displaying at least a first color and a second color; a pixel electrode corresponding to each of the pixels and formed between one of the substrates and the electrophoretic device; and a common electrode facing the plurality of pixel electrodes and formed between the other substrate and the electrophoretic device, the method including a first image display step of displaying a first image in the first color on the display section by using a partial-screen drive method for applying a voltage based on a drive pulse signal that repeats a first potential and a second potential to the common electrode and applying a voltage based on a reversal signal or a normal signal of the drive pulse signal to each of the plurality of pixel electrodes to produce an electric field between the pixel electrode and the common electrode so that the electrophoretic particles are moved to redraw an image displayed on the display section, a first image adjustment step of displaying a background of the first image in the second color on the display section by using the partial-screen drive method after the first image display step, a first image deletion step of displaying the background of the first image in the first color on the display section by using the partial-screen drive method after the first image adjustment step, a second image display step of displaying a background of a second image in the second color on the display section by using the partial-screen drive method after the first image deletion step, and a second image adjustment step of displaying the second image in the first color on the display section by using the partial-screen drive method after the second image display step, wherein the second image adjustment step is followed by a second image deletion step of displaying the second image in the second color on the display section by using the partial-screen drive method, and after the second image deletion step, the following first image display step is executed.

According to the aspect of the invention, adding the first image adjustment step and the second image adjustment step can reduce variations in the size and color tone of each of the first and second images. Since the first image is displayed in the first color in the first image display step, the first image is likely to spread and is hence likely to be visually recognized as a smeared image. The first image adjustment step of displaying the background of the first image in the second color can reduce the amount of smear. Further, since the background of the second image is displayed in the second color in the second image display step, the second image is likely to be visually recognized as a contracted image. The second image adjustment step of displaying the second image in the first color can display the second image in an appropriate size.

Even when the first image adjustment step and the second image adjustment step are added, DC balance can be achieved, for example, only by adjusting the execution period of each of the first image deletion step and the second image deletion step.

As described above, since variation in the size of each of the displayed first and second images is reduced in the aspect of the invention, a user will not think that something is wrong with the displayed image or perceive any change in color tone resulting from an increase or a decrease in the size of the displayed image. Further, since the DC balance is achieved, long-term reliability can be ensured and display quality can be improved.

In the partial-screen drive method, an image displayed on the display section is redrawn by applying a voltage based on a drive pulse signal that repeats a first potential and a second potential to the common electrode and applying a voltage based on a reversal signal or a normal signal of the drive pulse signal to each of the plurality of pixel electrodes to produce an electric field between the pixel electrode and the common electrode so that the electrophoretic particles are moved. The partial-screen drive method allows not only full drawing over the entire display section but also partial drawing of a portion to be redrawn.

Further, the first color is, for example, black and the second color is, for example, white. Each of the first image and the second image may be an image displayed on part of the display section and may, for example, be a character, a numeral, a sentence, a figure, a symbol, a pattern, or a combination thereof. Each of the first image and the second image may then be changed to a different character, numeral, sentence, figure, symbol, or pattern whenever displayed in the first image display step or the second image display step. The background of the first image and the background of the second image refer to the portion other than the first image and the portion other than the second image in the display section, respectively.

(2) In the method for driving an electrophoretic display apparatus described above, the first image deletion step may include a first-image-deletion first step of displaying the background of the first image in the first color in such a way that a voltage-time product in the first-image-deletion first step is equal to the voltage-time product in the first image display step, the voltage-time product being a product of a voltage applied between the common electrode and each of the pixel electrodes multiplied by a voltage application period and a first-image-deletion second step of displaying the background of the first image in the first color in such a way that the sum of the voltage-time product in the first-image-deletion second step and the voltage-time product in the first image adjustment step is zero, and the second image deletion step may include a second-image-deletion first step of displaying the second image in the second color in such a way that the voltage-time product in the second-image-deletion first step is equal to the voltage-time product in the second image display step and a second-image-deletion second step of displaying the second image in the second color in such a way that the sum of the voltage-time product in the second-image-deletion second step and the voltage-time product in the second image adjustment step is zero.

According to the aspect of the invention, the first image deletion step includes the first-image-deletion first step and the first-image-deletion second step, each of which is a sub-step. Further, the second image deletion step includes the second-image-deletion first step and the second-image-deletion second step, each of which is a sub-step. Adjusting the voltage-time product in each of the steps described above allows the DC balance to be accurately achieved, whereby long-term reliability can be ensured and display quality can be improved. The voltage-time product is a product of a voltage applied between the common electrode and any of the pixel electrodes multiplied by a voltage application period.

A specific example will be described below. It is assumed that the applied voltage has a positive sign when the potential at the common electrode is lower than the potential at the pixel electrode. It is further assumed that the voltage-time product in the first image display step is $+V_0*t_0$ and the voltage-time product in the first image adjustment step is $-V_1*t_1$. The voltage-time product in the first-image-deletion first step is then adjusted to be $+V_0*t_0$, which is the voltage-time product in the first image display step. Further, the voltage-time product in the first-image-deletion second step is adjusted to be $+V_1*t_1$, which allows the sum of the voltage-time product in the first image adjustment step and the voltage-time product in the first-image-deletion second step to be zero.

The voltage-time product in the second image display step is $-V_0*t_0$ in this example. Further, the voltage-time product in the second image adjustment step is assumed to be, for example, $+V_1*t_1$. The voltage-time product in the second-image-deletion first step is then adjusted to be $-V_0*t_0$, which is the voltage-time product in the second image display step. Further, the voltage-time product in the second-image-deletion second step is adjusted to be $-V_1*t_1$, which allows the sum of the voltage-time product in the second image adjustment step and the voltage-time product in the second-image-deletion second step to be zero.

As a result, the sum of the voltage-time products in the first image display step ($+V_0*t_0$), the first-image-deletion first step ($+V_0*t_0$), the second image display step ($-V_0*t_0$), and the second-image-deletion first step ($-V_0*t_0$) is zero, whereby the DC balance is achieved because the time average of the applied electric field is zero. Further, the sum of the voltage-time products in the first image adjustment step ($-V_1*t_1$) and the first-image-deletion second step ($+V_1*t_1$) is zero, and the sum of the voltage-time products in the second image adjustment step ($+V_1*t_1$) and the second-image-deletion second step ($-V_1*t_1$) is zero, as described above. The DC balance is therefore also achieved as a whole.

It is noted that the first-image-deletion first step, the first-image-deletion second step, the second-image-deletion first step, and the second-image-deletion second step can be adjusted independently of each other as long as the voltage-time products thereof satisfy the relationships described above. For example, the first-image-deletion first step and the first-image-deletion second step may have step execution periods and drive voltages different from each other. A flexible method for driving an electrophoretic display apparatus and other related apparatus are thus provided.

(3) In the method for driving an electrophoretic display apparatus described above, the voltage-time product in the first image adjustment step may be smaller than the voltage-time product in the first image display step, and the voltage-time product in the second image adjustment step may be smaller than the voltage-time product in the second image display step.

According to the aspect of the invention, even when the adjustment step (first image adjustment step or second image adjustment step) is added, setting the voltage-time product in the adjustment step to be smaller than the voltage-time product in the first image display step or second image adjustment step can prevent an increase in at least one of a period required to update a displayed image and power consumption resulting from the added adjustment step.

(4) In the method for driving an electrophoretic display apparatus described above, after the first image deletion step and before the second image display step, a first single-color display step of causing all the pixels of the display section to display the first color may be added, and after the second image deletion step and before the following first image display step, a second single-color display step of causing all the pixels of the display section to display the second color may be added.

According to the aspect of the invention, even when a boundary line occurs along the contour of the first image or the second image (pattern boundary line), adding the first single-color display step and the second single-color display step can make the pattern boundary line less visible.

In the first image display step and the first image deletion step, the partial-screen drive method is used to display and delete the first image. Further, in the second image display step and the second image deletion step as well, the partial-screen drive method is used to display and delete the second image. However, after the first image or the second image is deleted, a pattern boundary line is visually recognized in some cases. The reason why the pattern boundary line occurs is conceivably that among the electrophoresis particles, which will be described later, for example, the most recently driven color particles spread due to an electric field in an oblique direction.

In the method for driving an electrophoretic display apparatus described above, the degree of the thus formed pattern boundary line is reduced in the adjustment step (first image adjustment step or second image adjustment step). When the same display operation is repeated for a long period, however, a pattern boundary line is likely to be visually recognized.

In the aspect of the invention, after the first image deletion step, the first single-color display step of causing all the pixels to display the first color is executed. Further, after the second image deletion step, the second single-color display step of causing all the pixels to display the second color is executed. As a result, even in case a pattern boundary line occurs, the pattern boundary line can be eliminated, and the display quality can be improved.

Each of the first single-color display step and the second single-color display step is preferably executed by using the partial-screen drive method in order to shorten the period required to update a displayed image but may be executed by using the full-screen drive method. In each of the first single-color display step and the second single-color display step, the single-color display operation may be performed multiple times. For example, in the first single-color display step, all the pixels may be caused to display the first color, the second color, and the first color in this order. In this case, in the second single-color display step, all the pixels are caused to display the second color, the first color, and the second color in this order.

In the method for driving an electrophoretic display apparatus according to the aspect of the invention, the DC balance is achieved based on the first single-color display step and the second single-color display step. The DC balance is therefore achieved as a whole in the method for driving an electrophoretic display apparatus according to the aspect of the invention.

(5) Another aspect of the invention may relate to an electrophoretic display apparatus including a control section that executes any of the methods for driving an electrophoretic display apparatus described above.

According to the aspect of the invention, the driving method described above is achieved by the control section provided in the electrophoretic display apparatus. The electrophoretic display apparatus according to the aspect of the invention therefore not only achieves the DC balance but also reduces variations in the size and color tone of a displayed image that may occur in the partial-screen drive method. The electrophoretic display apparatus therefore excels in long-term reliability and provides improved display quality.

(6) Another aspect of the invention may relate to an electronic apparatus including the electrophoretic display apparatus described above.

(7) Another aspect of the invention may relate to an electronic timepiece including the electrophoretic display apparatus described above.

The electronic apparatus and the electronic timepiece according to the aspects of the invention, which use the electrophoretic display apparatus described above, not only achieve the DC balance but also reduce variations in the size and color tone of a displayed image that may occur in the partial-screen drive method. The electronic apparatus and the electronic timepiece therefore excels in long-term reliability and provides improved display quality.

BRIEF DESCRIPTION OF THE DRAWINGS

FIGS. 8A, 8B, 8C, 8D, 8E, 8F, 8G and 8H show examples of display operation in Comparative Example.

FIG. 12 describes a method in the first embodiment for avoiding the smearing in Comparative Example.

FIGS. 13A, 13B, 13C, 13D, 13E and 13F show examples of display operation in the first embodiment.

DETAILED DESCRIPTION OF THE EMBODIMENTS

1. First Embodiment

A first embodiment of the invention will be described with reference to the FIGS. 1 to 7E and FIGS. 12 to 18. An electrophoretic display apparatus according to the first embodiment can display a variety of images, such as a character, a numeral, a photograph, a pattern, and an illustration. To describe a method for driving the electrophoretic display apparatus according to the first embodiment, a method for driving an electrophoretic display apparatus according to Comparative Example (hereinafter simply referred to as Comparative Example) will be described in the course of the following description. Comparative Example can also be achieved based on an electrophoretic display apparatus having the same configuration as that in the first embodiment. Comparative Example will be described with reference to FIGS. 8A to 11C.

1.1. Configuration of Electrophoretic Display Apparatus

Figure 1:
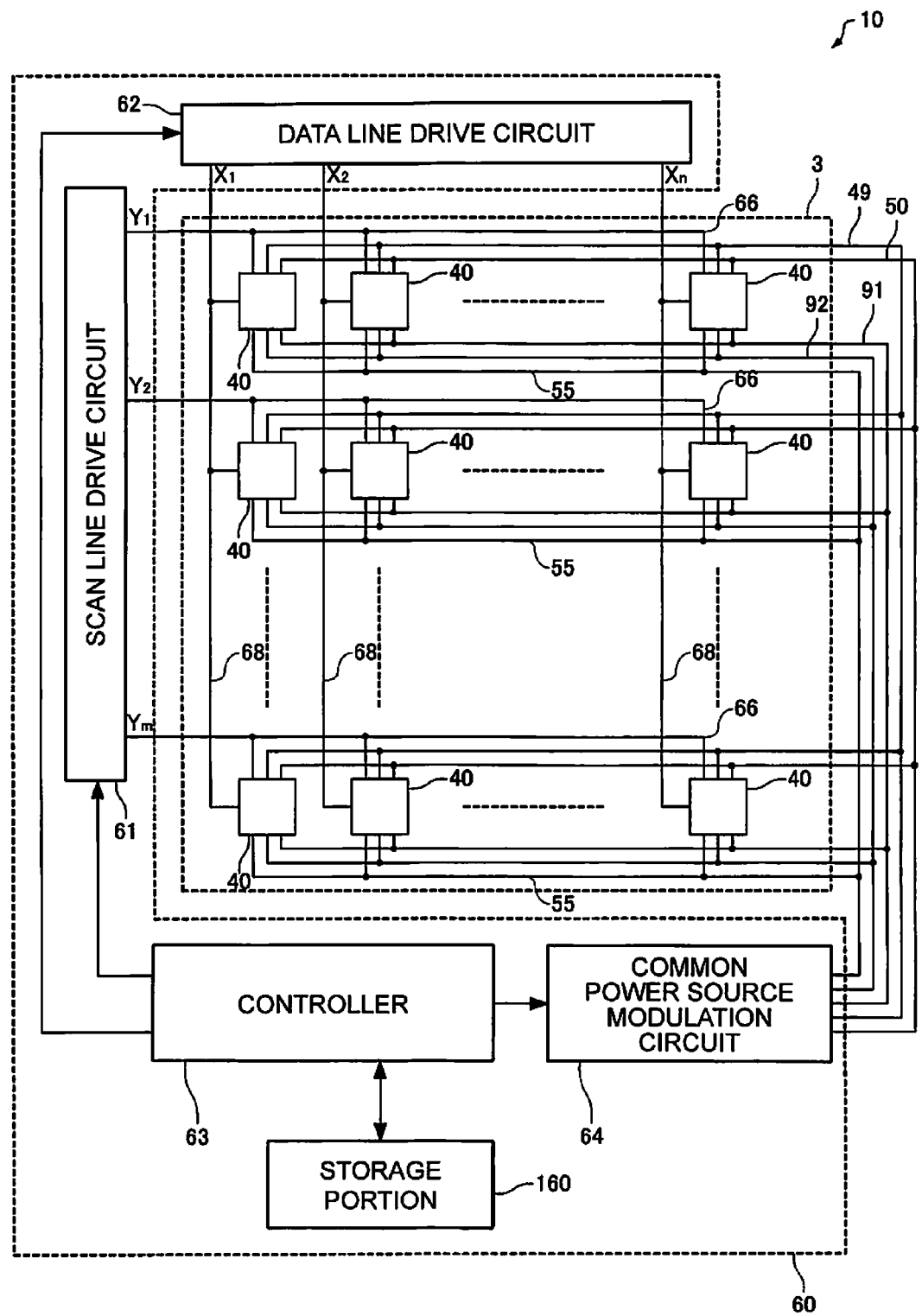
FIG. 1 is a block diagram of an electrophoretic display apparatus in a first embodiment.

FIG. 1 shows the configuration of an active-matrix-based electrophoretic display apparatus according to the present embodiment.

An electrophoretic display apparatus 10 includes a display control circuit 60 and a display section 3. The display control circuit 60 is a control section that controls the display section 3 and includes a scan line drive circuit 61, a data line drive circuit 62, a controller 63, a common power source modulation circuit 64, and a storage portion 160.

The scan line drive circuit 61, the data line drive circuit 62, the common power source modulation circuit 64, and the storage portion 160 are connected to the controller 63. The controller 63 controls the components connected thereto in an integrated manner based on input signals (not shown), such as a time signal.

The storage portion 160 may include, for example, a VRAM, and a flash memory or any other nonvolatile memory (not shown). The VRAM stores data on an image to be displayed on the display section 3. The VRAM may be divided into a plurality of banks, and each of the banks may function as an individual VRAM. The nonvolatile memory stores data on elements (part data and background data, for example) that form the data stored in the VRAM. The storage portion 160 may further include, for example, an SRAM and a DRAM.

The display section 3 has the following wiring lines formed therein: a plurality of scan lines 66 extending from the scan line drive circuit 61; and a plurality of data lines 68 extending from the data line drive circuit 62, and a plurality of pixels 40 are provided in correspondence with intersection positions where the two types of lines intersect each other.

The scan line drive circuit 61 is connected to the pixels 40 via the scan lines 66, the number of which is m (Y1, Y2, ..., Ym). The scan line drive circuit 61 supplies a selection signal that sequentially selects one of the first-row to m-th-row scan lines 66 under the control of the controller 63 to define ON timing at which a drive TFT 48 (see FIG. 2), which is provided in each of the pixels 40, is turned on.

The data line drive circuit 62 is connected to the pixels 40 via the data lines 68, the number of which is n (X1, X2, ..., Xn). The data line drive circuit 62 supplies each of the pixels 40 with an image signal that defines 1-bit image data corresponding to each of the pixels under the control of the controller 63. In the present embodiment, to define pixel data of "0", the data line drive circuit 62 supplies the pixel 40 with a low-level image signal, whereas to define pixel data of "1", the data line drive circuit 62 supplies the pixel 40 with a high-level image signal.

The display section 3 further has the following wiring lines provided therein: a low-potential power source line 49 (Vss); a high-potential power source line 50 (Vdd); a common electrode wiring line 55 (Vcom); a first pulse signal line 91 (S1); and a second pulse signal line 92 (S2), which extend from the common power source modulation circuit 64 and are connected to the pixels 40. The common power source modulation circuit 64 not only produces a variety of signals supplied to the wiring lines described above but also electrically connects the wiring lines to and disconnects them from the pixels 40 (brings them into high-impedance states, Hi-Z) under the control of the controller 63.

1.2 Circuit Configuration of Pixel Portion

Figure 2:
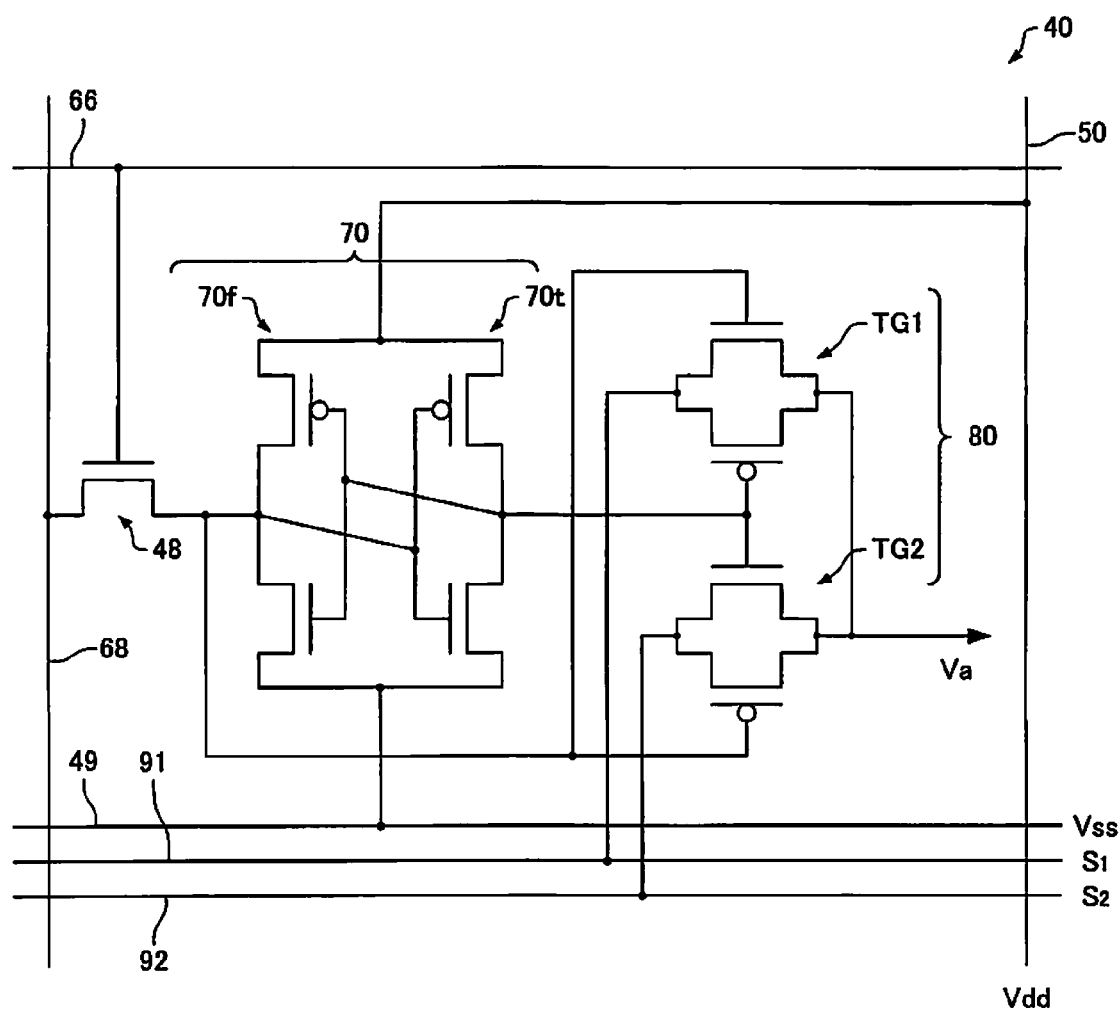
FIG. 2 shows an example of the configuration of each pixel in the electrophoretic display apparatus in the first embodiment.

FIG. 2 is a circuit configuration diagram of one of the pixels 40 shown in FIG. 1. The same wiring lines as those in FIG. 1 have the same reference numerals and will not be described. Further, the common electrode wiring line 55, which is common to all the pixels, is not shown.

Each of the pixels 40 is provided with a drive TFT (thin film transistor) 48, a latch circuit 70, and a switch circuit 80. The pixel 40 has a configuration of an SRAM (static random access memory), in which the latch circuit 70 holds an image signal as a potential.

The drive TFT 48 is a pixel switching device formed of an N-MOS transistor. The terminals of the drive TFT 48 are connected as follows: The gate terminal is connected to the corresponding scan line 66; the source terminal is connected to the corresponding data line 68; and the drain terminal is connected to a data input terminal of the latch circuit 70. The latch circuit 70 includes a transfer inverter 70*t* and a feedback inverter 70*f*. The low-potential power source line 49 (Vss) and the high-potential power source line 50 (Vdd) supply the transfer inverter 70*t* and the feedback inverter 70*f* with the respective power source voltages.

The switch circuit 80 is formed of transmission gates TG1 and TG2 and outputs a signal to a pixel electrode 35 (see FIGS. 3B and 3C) in accordance with the level of image data stored in the latch circuit 70. Reference character Va denotes a potential (signal) supplied to the pixel electrode of the pixel 40.

When the latch circuit 70 stores image data of "1" (high-level image signal) and hence the transmission gate TG1 is turned on, the switch circuit 80 supplies a signal S1 having the potential Va. On the other hand, when the latch circuit 70 stores image data of "0" (low-level image signal) and hence the transmission gate TG2 is turned on, the switch circuit 80 supplies a signal S2 having the potential Va. The circuit configuration described above allows the display control circuit 60 to control the potential (signal) supplied to the pixel electrode of each of the pixels 40.

1.3. Display Method

The electrophoretic display apparatus 10 according to the present embodiment is assumed to operate based on dualparticle, microcapsule-type electrophoresis. It is also assumed that a dispersion liquid is colorless and transparent and the colors of electrophoretic particles are white and black. At least two colors or black and white as two basic colors can therefore be displayed. The following description will be made of a case where the electrophoretic display apparatus 10 can display black and white as basic colors. Causing a pixel that is displaying black to display white or causing a pixel that is displaying white to display black is called reversal.

Figure 3A:
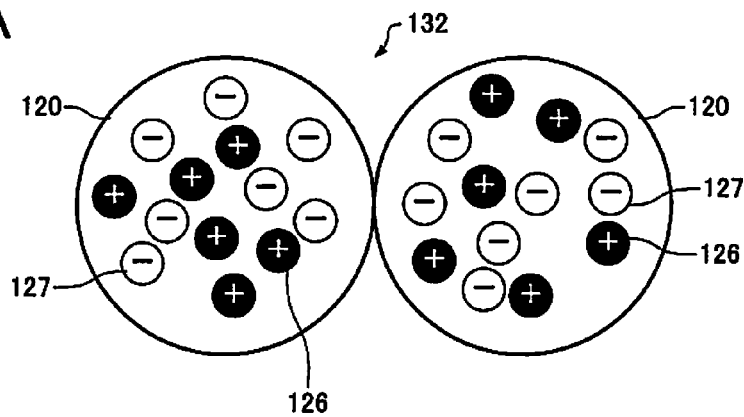
FIG. 3A shows an example of the configuration of an electrophoretic device.

FIG. 3A shows the configuration of an electrophoretic device 132 in the present embodiment. The electrophoretic device 132 is sandwiched between a device substrate 130 and a counter substrate 131 (see FIGS. 3B and 3C). The electrophoretic device 132 has a plurality of microcapsules 120 arranged therein. Each of the microcapsules 120 has, for example, the following components sealed therein: a colorless, transparent dispersion liquid; a plurality of white electrophoretic particles (white particles 127); and a plurality of black electrophoretic particles (black particles 126). It is assumed, for example, in the present embodiment that the white particles 127 are negatively charged and the black particles 126 are positively charged.

Figure 3B:
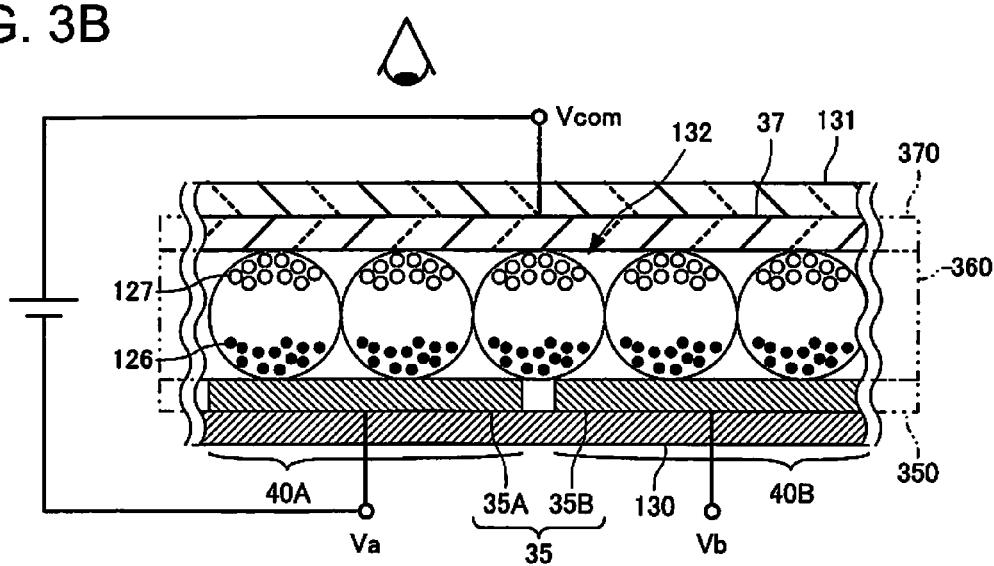
FIGS. 3B and 3C describe operation of the electrophoretic device.

FIG. 3B is a partial cross-sectional view of the display section 3 of the electrophoretic display apparatus 10. The device substrate 130 and the counter substrate 131 sandwich the electrophoretic device 132, which has the microcapsules 120 arranged therein. The display section 3 (see FIG. 1) includes a drive electrode layer 350, in which a plurality of pixel electrodes 35 are formed, on the side of the device substrate 130 that faces the electrophoretic device 132. In FIG. 3B, a pixel electrode 35A and a pixel electrode 35B are shown as each of the pixel electrodes 35. Each of the pixel electrodes 35 can supply the corresponding pixel with a potential (Va, Vb, for example). Now, let a pixel 40A be a pixel having the pixel electrode 35A and a pixel 40B be a pixel having the pixel electrode 35B. The pixels 40A and 40B are two pixels corresponding to each of the pixels 40 (see FIGS. 1 and 2).

On the other hand, the counter substrate 131 is a transparent substrate, and an image is displayed on the side of the display section 3 that faces the counter substrate 131. The display section 3 further includes a common electrode layer 370, in which a flat-plate-shaped common electrode 37 is formed, on the side of the counter substrate 131 that faces the electrophoretic device 132. The common electrode 37 is a transparent electrode. The common electrode 37 is an electrode common to all the pixels, unlike the pixel electrodes 35, and a potential Vcom is supplied to the common electrode 37.

The electrophoretic device 132 is disposed in an electrophoretic display layer 360 provided between the common electrode layer 370 and the drive electrode layer 350, and the electrophoretic display layer 360 forms a display area. A desired display color can be displayed on a pixel basis in accordance with the difference in potential between the common electrode 37 and the pixel electrode (35A, 35B, for example). To fix the electrophoretic display layer 360 to the drive electrode layer 350, for example, a conductive adhesive layer (not shown) is provided in some cases between the electrophoretic display layer 360 and the drive electrode layer 350.

In FIG. 3B, the potential Vcom at the common electrode is higher than the potential Va at the pixel electrode of the pixel 40A. In this case, since the negatively charged white particles 127 are attracted toward the common electrode 37 and the positively charged black particles 126 are attracted toward the pixel electrode 35A, the pixel 40A is visually recognized as a pixel that displays white.

Figure 3C:
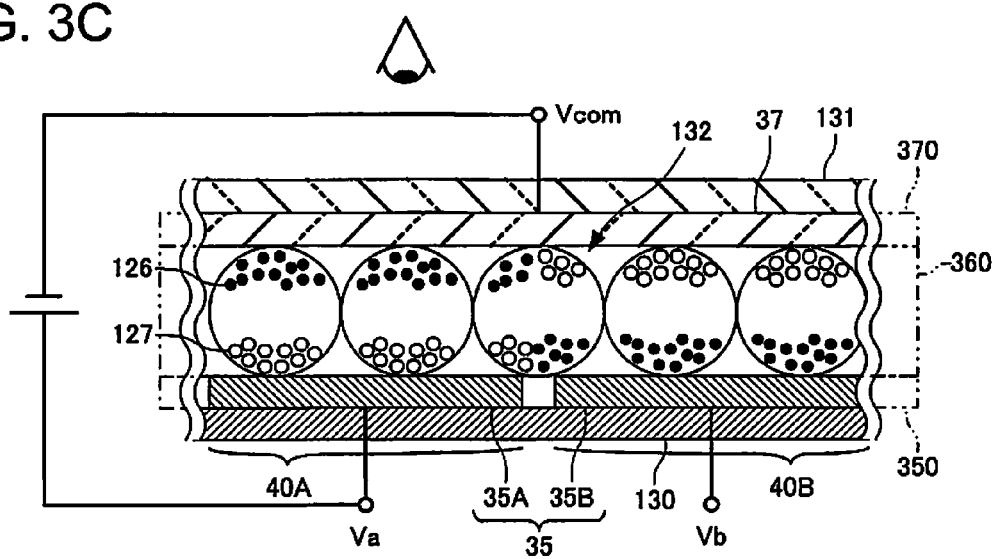

In FIG. 3C, the potential Vcom at the common electrode is lower than the potential Va at the pixel electrode of the pixel 40A. In this case, in contrast to the above, since the positively charged black particles 126 are attracted toward the common electrode 37 and the negatively charged white particles 127 are attracted toward the pixel electrode 35A, the pixel 40A is visually recognized as a pixel that displays black. The configuration shown in FIG. 3C is the same as that in FIG. 3B and will not be described. Further, in FIGS. 3B and 3C, the description has been made assuming that Va, Vb, and Vcom are fixed potentials, but Va, Vb, and Vcom are potentials that actually change with time. In the following description, a signal that provides any of the potentials Va, Vb, and Vcom is called a pulse signal. A pulse signal to the common electrode is particularly called a drive pulse signal.

Assume now that the state shown in FIG. 3B is an initial state and changes to the state shown in FIG. 3C. In this process, the pixel 40A having been displaying white then displays black, and the direction of the applied electric field is totally reversed. The electric fields thus applied to the pixel 40A are symmetric with each other, and hence the DC balance is achieved. On the other hand, the pixel 40B is displaying only white, and the electric field applied thereto is therefore not a symmetric electric field, and hence the DC balance is not achieved. To ensure long-term reliability of the electrophoretic display apparatus, reversal display operation needs to be performed, as performed in the pixel 40A in this example.

1.4. Drive Method

A pulse signal drive method based on which the control section (corresponding to display control circuit 60 in FIG. 1) displays an image on the display section will first be described with reference to FIGS. 4A to 7E.

1.4.1. Partial-Screen Drive Method

Figure 4A:
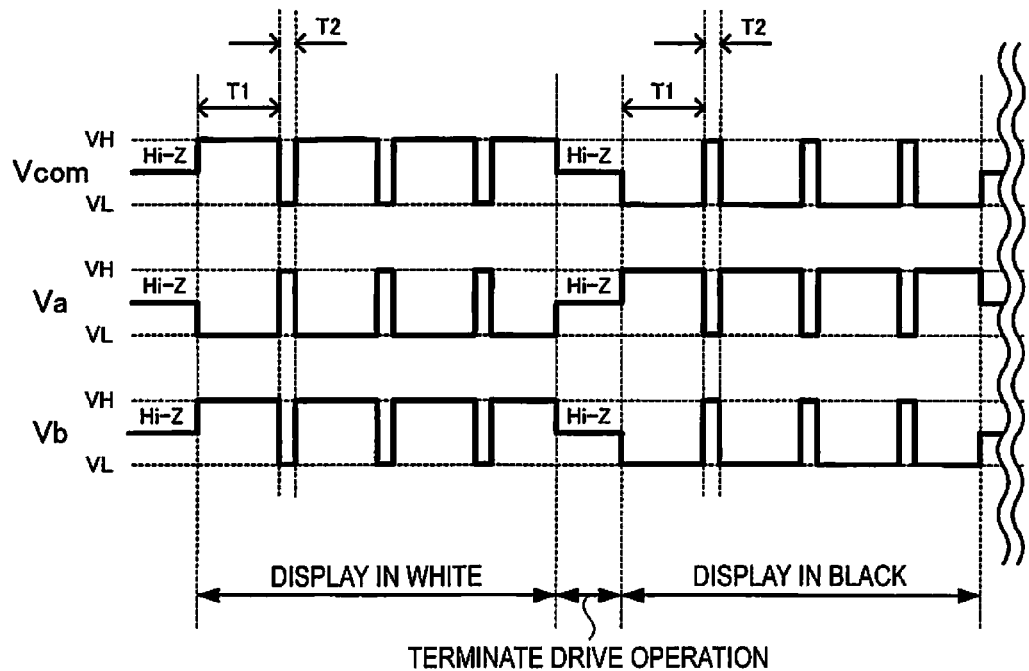
FIGS. 4A and 4B show examples of waveforms and reflectance in a partial-screen drive method.

FIG. 4A shows waveforms used in the partial-screen drive method. In an electrophoretic display apparatus, to increase a response speed, the entire display section is not involved but a portion thereof to be redrawn is involved in drawing operation in some cases. The partial-screen drive method allows partial drawing of a portion to be redrawn. It is noted that Va, Vb, and Vcom in FIG. 4A are the same as those in FIGS. 3B and 3C, and that each of Va, Vb, and Vcom can take a value of a high level (VH) or a low level (VL), or a high-impedance state (Hi-Z).

Vcom in FIG. 4A shows an example of the drive pulse signal to the common electrode. Vcom has the following two pulses alternately repeated: a pulse that has a pulse width T1 (hereinafter simply referred to as T1) and causes application of a first potential to the common electrode; and a pulse that follows the T1 pulse, has a shorter pulse width T2 (hereinafter simply referred to as T2), and causes application of a second potential to the common electrode (reverse potential drive pulse). As an exception, however, the first potential is applied to the common electrode immediately before the drive operation is terminated, as shown in FIG. 4A. The reverse potential drive pulse, which has a shorter pulse width, allows the drive period required for partial redrawing to be further shortened. It is noted that the first potential is VH (second potential is VL) for display in white, whereas the first potential is VL (second potential is VH) for display in black. Further, for example, T2 may be as short as about 1% to 15% of T1.

In this example, a pulse signal that provides the potential Va applied to the pixel electrode of a pixel 40A is a reversal signal of the drive pulse signal. Further, a pulse signal that provides the potential Vb applied to the pixel electrode of a pixel 40B is the same as the drive pulse signal (normal signal). The pixels 40A and 40B are, for example, the two pixels shown in FIG. 3B. The pixel 40A that is displaying black is so redrawn in a period labeled with "display in white" in FIG. 4A that the pixel 40A displays white, and the pixel 40A that is displaying white is then so redrawn in a period labeled with "display in black" in FIG. 4A that the pixel 40A displays black. On the other hand, the pixel 40B is not redrawn, because no electric field is produced between the common electrode and the pixel electrode, and hence keeps displaying black from the beginning.

Figure 4B:
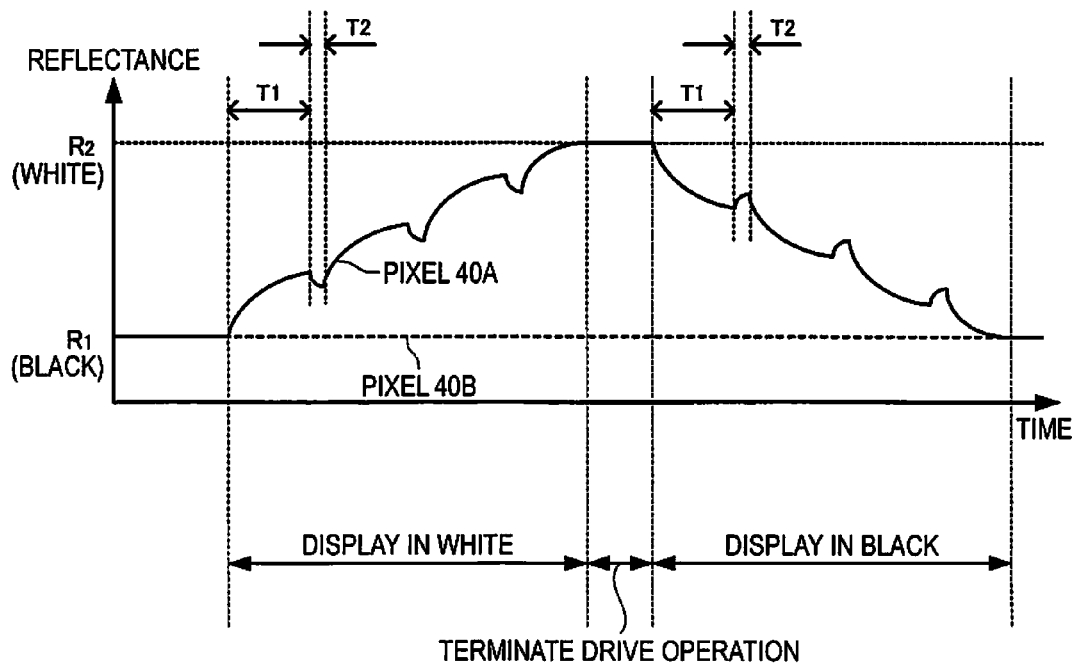

FIG. 4B shows changes in color (reflectance) of each of the pixels 40A and 40B in the example shown in FIG. 4A. A description will first be made of the pixel 40A. It is assumed that the pixel 40A initially displays black. In the segment corresponding to T1 in the period labeled with "display in white," in which the potential at the pixel electrode is VL and the potential at the common electrode is VH, the displayed color approaches white. In the segment corresponding to T2 in the period labeled with "display in white," however, in which the potential at the pixel electrode is VH and the potential at the common electrode is VL, the displayed color approaches black. However, since T1>T2, the pixel 40A displays white at the end of the period labeled with "display in white." The pixel 40A then displays black at the end of the period labeled with "display in black," where the polarity of Vcom is reversed.

On the other hand, the pixel 40B keeps displaying black from the beginning because the pixel electrode of the pixel 40B keeps receiving the same signal as Vcom and hence no difference in potential is produced. The partial-screen drive method can thus drive only a pixel that is desired to be changed, whereby the response speed of image redrawing operation can be increased. In particular, using the reverse potential drive pulse having a short pulse width allows the drive period required for partial redrawing to be shortened.

The pulse-signal-based drive method described above is called the partial-screen drive method because it is suitable for partial drawing of a portion to be redrawn. In the partial-screen drive method, however, a portion to be redrawn is not limited to part of the pixels of the display section. In other words, drawing can be performed by using all the pixels of the display section in the partial-screen drive method.

1.4.2. Problem with Partial-Screen Drive Method

Figures 5A, 5B, 5C, 5D:
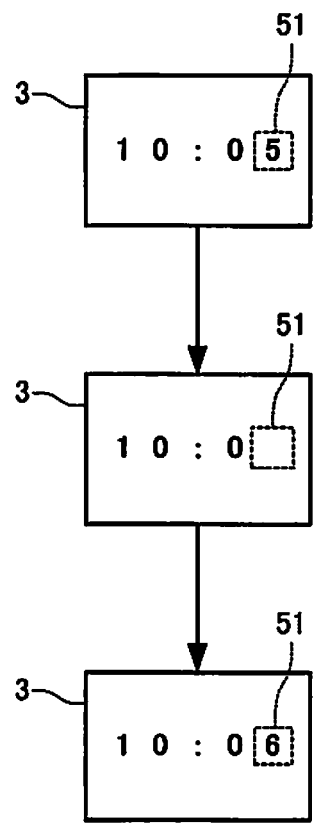
FIGS. 5A, 5B, 5C and 5D describe a decrease in local contrast ratio.

FIGS. 5A to 5D describe a decrease in local contrast ratio in a case where the partial-screen drive method is used to keep redrawing a partial area. In FIGS. 5A to 5C, time (10:05 or 10:06) is displayed on the display section 3, and the partial-screen drive method is used to redraw an area 51 containing the one's digit of the minute.

In FIG. 5A, time 10:05 is displayed. When the time is changed to 10:06, "5", which is the one's digit of the minute, in the area 51 is deleted by displaying "5" in the reversed color (displaying "5" in white), as shown in FIG. 5B. Thereafter, "6" in black with the white background is normally displayed, as shown in FIG. 5C. In this process, not only is the DC balance achieved based on FIGS. 5A and 5B but also the update display operation takes a short period because it is performed within the area 51, which is part of the display section 3. An electrophoretic display apparatus capable of achieving the DC balance to ensure long-term reliability and quickly performing update display operation can be provided by using the partial-screen drive method, for example, to update the time display as shown in FIGS. 5A to 5C.

Keeping performing the update display operation described above for a long period, however, causes a decrease in local contrast ratio in some cases. FIG. 5D shows an example of the decrease in local contrast ratio. In FIG. 5D, in which the entire screen of the display section 3 is displayed in white, a decrease in contrast ratio occurs in the area 51. White in the area 51 therefore differs from white in another area (area 52, for example).

A decrease in local contrast ratio occurs when an electric field is repeatedly applied to the area 51, which is part of the display section 3, for a long period. The reason for this is that the number of operations of driving a signal used to apply a voltage to the area 51 will greatly differ with elapsed time from the number of operations of driving a signal used to apply a voltage to an area other than the area 51 (area 52, for example). A decrease in local contrast ratio, such as that shown in FIG. 5D, undesirably lowers display quality of the display section 3.

1.4.3. Full-Screen Drive Method

Figure 6A:
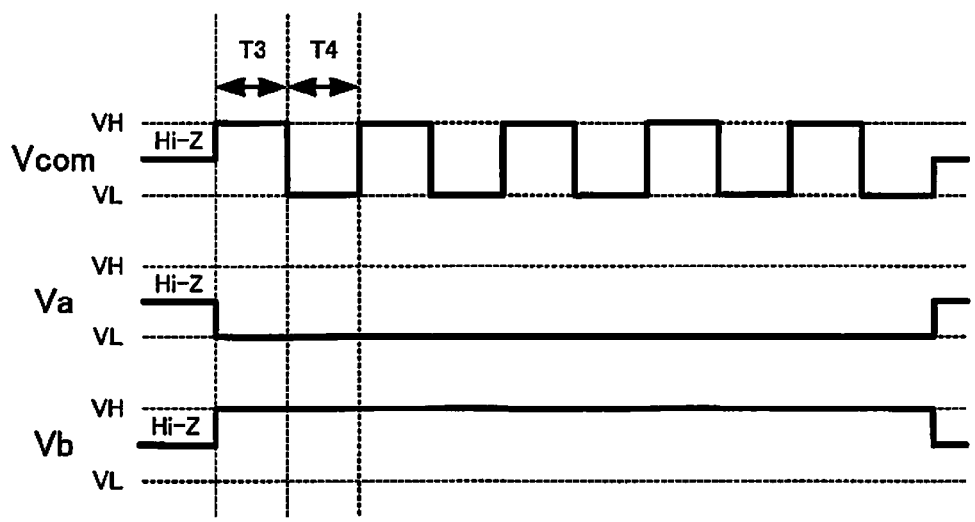
FIGS. 6A and 6B show examples of waveforms and reflectance in a full-screen drive method.

FIG. 6A shows waveforms used in the full-screen drive method. An electrophoretic display apparatus can also display an image by using the full-screen drive method, in which the entire display section is involved in drawing operation. In this method, since no electric field is repeatedly applied to a partial area of the display section for a long period, no decrease in local contrast ratio occurs, unlike in the partial-screen drive method. It is noted that Va, Vb, Vcom, VH, and VL in FIG. 6A are the same as those in FIGS. 3A to 4B and will not be described.

FIG. 6A is a waveform diagram in a case where the full-screen drive method is used to change the color of the pixel 40A from black to white whereas changing the color of the pixel 40B from white to black. In FIG. 6A, during the period in which the display colors are changed, Va remains at the low level (VL) and Vb remains at the high level (VH). On the other hand, Vcom is repeatedly changed from VL to VH and vice versa at equal intervals. That is, a pulse width T3 (hereinafter simply referred to as T3) and a pulse width T4 (hereinafter simply referred to as T4) in FIG. 6A are equal to each other.

Figure 6B:
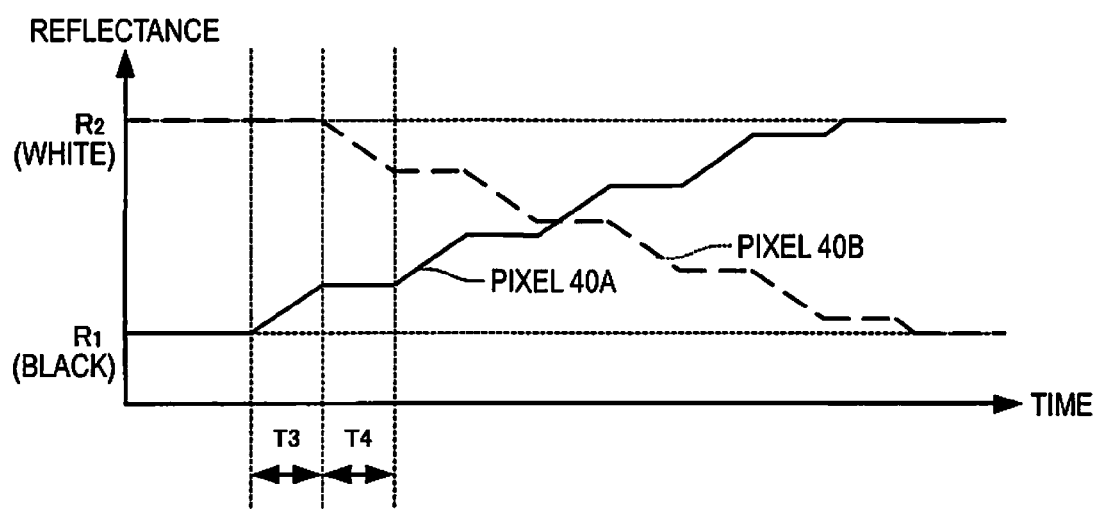

FIG. 6B shows changes in color (reflectance) of the pixels 40A and 40B according to the example shown in FIG. 6A. The pixel 40A initially displays black. In the segment corresponding to T3 in FIG. 6B, the color of the pixel 40A approaches white because the potential at the pixel electrode is VL and the potential at the common electrode is VH. In the segment corresponding to T4 in FIG. 6B, the color is maintained the same because no difference in potential between the pixel electrode and the common electrode is produced. The color of the pixel 40A eventually changes from black to white.

On the other hand, the pixel 40B initially displays white. In the segment corresponding to T3 in FIG. 6B, the color of the pixel 40B is maintained the same because no difference in potential between the pixel electrode and the common electrode is produced. In the segment corresponding to T4 in FIG. 6B, the color of the pixel 40B approaches black because the potential at the pixel electrode is VH and the potential at the common electrode is VL. The color of the pixel 40B eventually changes from white to black.

In the full-screen drive method, the potential VL or VH is applied to the pixel electrode of each of the pixels of the display section 3. No decrease in local contrast ratio occurs because no electric field is repeatedly applied for a long period only to a partial area of the display section.

In the full-screen drive method, all the pixels of the display section are involved in drawing operation, and only part of the pixels of the display section are not allowed to be involved in redrawing operation. In the full-screen drive method, all the pixels of the display section are literally involved in drawing operation.

1.4.4. Problem with Full-Screen Drive Method

Figure 7A:
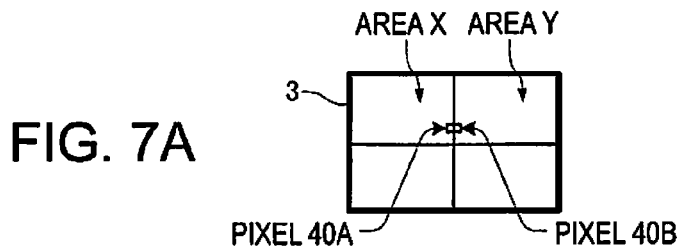
FIGS. 7A, 7B, 7C, 7D and 7E describe an afterimage produced in the full-screen drive method.

FIGS. 7A to 7E describe an afterimage produced in the full-screen drive method. First, the display section 3 is divided into four areas (upper left, upper right, lower left, and lower right areas), and the upper left area and the upper right area are particularly called an area X and an area Y, respectively, as shown in FIG. 7A. It is assumed that pixels 40A and 40B adjacent to each other, such as those shown in FIG. 3B, are present in the areas X and Y, respectively.

Figure 7B:
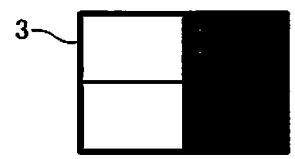
Figure 7C:
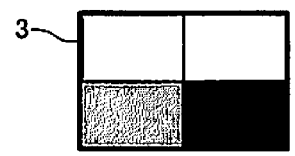
Figure 7D:
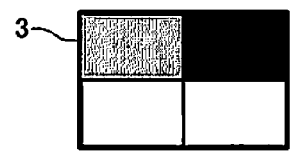

FIGS. 7B to 7D show that an image is updated by using the full-screen drive method. First, the left half of the display section 3 that includes the area X is displayed in white and the right half including the area Y is displayed in black in FIG. 7B. It is assumed that the image shown in FIG. 7B is an initial image before updated.

The displayed image is then so updated that the upper portion including the areas X and Y is displayed in black. Before the update, a reversal image is first displayed to achieve the DC balance, as shown in FIG. 7C. That is, the areas X and Y are displayed in white, as shown in FIG. 7C.

An image having a black upper portion including the areas X and Y is then displayed, but black in the area Y differs from black in the area X, as shown in FIG. 7D. In the example shown in FIG. 7D, the black in the area X has reflectance higher than the reflectance of the black in the area Y. Such a difference in reflectance produces an afterimage in some cases when the full-screen drive method is used to update an image.

Figure 7E:
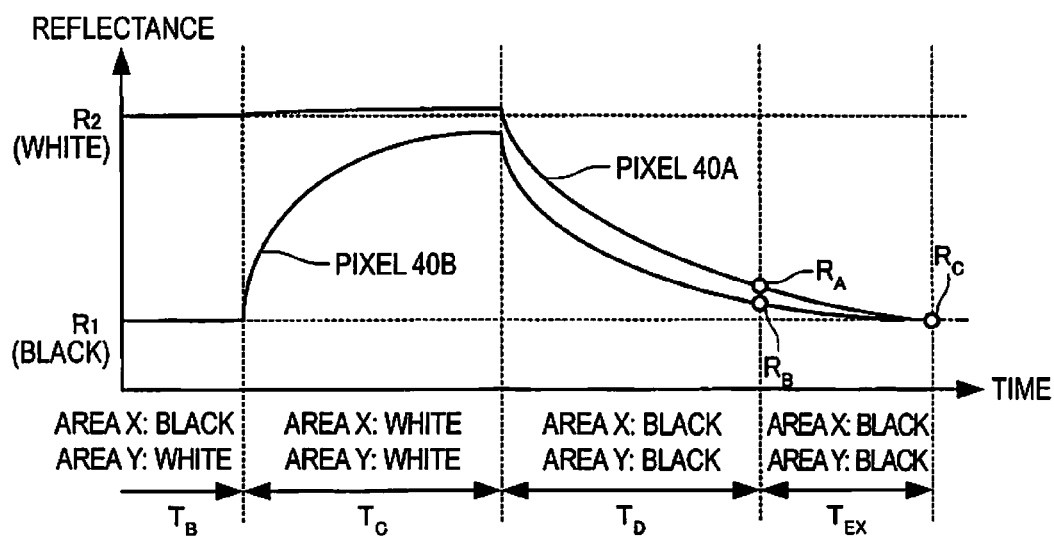

FIG. 7E compares the change in reflectance of the pixel 40A contained in the area X with the change in reflectance of the pixel 40B contained in the area Y. A segment $T_B$ in FIG. 7E corresponds to FIG. 7B, a segment $T_C$ in FIG. 7E corresponds to FIG. 7C, and a segment $T_D$ in FIG. 7E corresponds to FIG. 7D. The pixel 40A initially (in segment $T_B$) displays white and the color thereof is then changed to white and black (segments $T_C$, $T_D$). The change is expressed as (white, white, black). The change in color of the pixel 40B can similarly be expressed as (black, white, black).

When the pulse signal drive period is sufficiently long in the full-screen drive method (when $T_D$ is extended by $T_{EX}$), the reflectance of each of the pixels 40A and 40B converges into reflectance $R_C$ (=$R_I$) shown in FIG. 7E. No afterimage therefore occurs because no difference in reflectance is produced. In practice, however, no extension Tex will be added in order to shorten the displayed image update period. In this case, the pixel 40A that undergoes the change (white, white, black) has reflectance $R_A$ and the pixel 40B that undergoes the change (black, white, black) has reflectance $R_B$, resulting in an afterimage because a difference in reflectance is produced.

As described above, when the full-screen drive method is used in place of the partial-screen drive method, no decrease in local contrast ratio occurs but an afterimage specific to the full-screen drive method (hereinafter referred to as full-screen-drive-method-specific afterimage) may occur as another problem. In view of the fact described above, an electrophoretic display apparatus driving method that does not cause a decrease in local contrast ratio or a full-screen-drive-method-specific afterimage is desired.

1.5. Examples of Display Operation in Comparative Example

As an electrophoretic display apparatus driving method that does not cause a decrease in local contrast ratio or a full-screen-drive-method-specific afterimage, the following method according to Comparative Example is first conceivable. FIGS. 8A to 8H show examples of display operation in Comparative Example. The left portion of each of FIGS. 8A to 8H shows an image displayed on the display section 3, and the right portion thereof shows driven pixels 13 expressed in dark gray, which are pixels driven to display the image on the display section 3. Below the driven pixels 13 are shown information on the used drive method, the full-screen drive method or the partial-screen drive method, and information on the actual color, black or white, of the driven pixels 13 expressed in dark gray in the figures.

The names of steps shown in FIGS. 8A to 8H correspond to the names of steps in a flowchart described later. The numeral in parentheses following the name of each of the steps distinguishes steps having the same name from each other and stands for the order of execution.

The control section of the electrophoretic display apparatus updates an image displayed on the display section from an initial image having already been displayed to a new image that follows. That is, the control section deletes the initial image and displays the new image.

The operation of deleting the initial image and the operation of displaying the new image are performed in a predetermined order. An image is updated in stages called steps. For example, a stage in which the control section displays a first image is expressed as a first image display step. In the following description, action of the control section in each of the steps is simply expressed as "execution of step." For example, when the control section displays a first image in the first image display step, the action is simply expressed as execution of the first image display step.

FIG. 8A shows an image displayed on the display section 3 and the driven pixels 13 used in the display operation after execution of the first image display step (1). In the first image display step (1), time display of 10:05 (corresponding to first image) is displayed in black (corresponding to first color) on the display section 3 by using the partial-screen drive method. It is assumed that the entire display section 3 displays white before the execution of the first image display step (1).

FIG. 8B shows an image displayed on the display section 3 and the driven pixels 13 used in the display operation after execution of a first image deletion step (1). In the first image deletion step (1), the portion other than the time display of 10:05 (corresponding to background of first image) is displayed in black (corresponding to first color) on the display section 3 by using the partial-screen drive method. At this point, the entire display section 3 displays black.

FIG. 8C shows an image displayed on the display section 3 and the driven pixels 13 used in the display operation after execution of a second image display step (1). In the second image display step (1), the portion other than time display of 10:06 (corresponding to background of second image) is displayed in white (corresponding to second color) on the display section 3 by using the partial-screen drive method. At this point, the display section 3 displays the time display of 10:06 in black.

FIG. 8D shows an image displayed on the display section 3 and the driven pixels 13 used in the display operation after execution of a second image deletion step (1). In the second image deletion step (1), the time display of 10:06 (corresponding to second image) is displayed in white (corresponding to second color) by using the partial-screen drive method. At this point, the entire display section 3 displays white.

FIG. 8E shows an image displayed on the display section 3 and the driven pixels 13 used in the display operation after the execution of the second image deletion step (1) and the first image display step (2) that follows. In the first image display step (2), time display of 10:07 (corresponding to first image)

is displayed in black (corresponding to first color) on the display section 3 by using the partial-screen drive method.

The following FIGS. 8F to 8H are similar to FIGS. 8B to 8D but correspond to cases where the first image shows the time display of 10:07 and the second image shows time display of 10:08, and no description of FIGS. 8F to 8H will therefore be made in detail. In the examples shown in FIGS. 8A to 8H, the time display changes at one-minute intervals and each of the steps is executed in correspondence with the change. For example, one minute after the time display of 10:05 is displayed (FIG. 8A), the entire display section 3 displays black (FIG. 8B) and the time display of 10:06 is subsequently displayed (FIG. 8C).

The steps described above (first image display step, first image deletion step, second image display step, and second image deletion step) are all executed by using the partial-screen drive method, whereby no full-screen-drive-method-specific afterimage occurs.

Based on the driven pixels 13 in the first image display step (1) and those in the first image deletion step (1) as a whole, the color displayed by the pixels of the entire display section is changed to black (a1 in FIGS. 8A and 8B). On the other hand, based on the driven pixels 13 in the second image display step (1) and those in the second image deletion step (1) as a whole, the color displayed by the pixels of the entire display section is changed to white (b1 in FIGS. 8C and 8D). The four steps therefore allow the DC balance to be achieved (a1 and b1 in FIGS. 8A to 8D). The DC balance is similarly achieved based on a2 and b2 in FIGS. 8E to 8H.

In Comparative Example, the problem of a decrease in local contrast ratio that can occur in the partial-screen drive method will not occur. The reason for this is that the color of the pixels of the entire display section is changed to black (first image display step and first image deletion step) or white (second image display step and second image deletion step) so that uniform electric field application is performed over the entire display section.

A decrease in local contrast ratio occurs when an electric field is repeatedly applied to a partial area of the display section (hereinafter referred to as specific area) for a long period. That is, the problem occurs because the number of operations of driving a signal used to apply a voltage to a specific area will greatly differ with elapsed time from the number of operations of driving a signal used to apply a voltage to another area other than the specific area. In the method for driving an electrophoretic display apparatus according to the embodiment of the invention, in which no such a specific area is present, no decrease in local contrast ratio will occur.

Comparative Example therefore provides an electrophoretic display apparatus driving method that allows the DC balance to be achieved but does not cause a decrease in local contrast ratio or a full-screen-drive-method-specific afterimage.

1.6. Flowchart in Comparative Example

Figure 9:
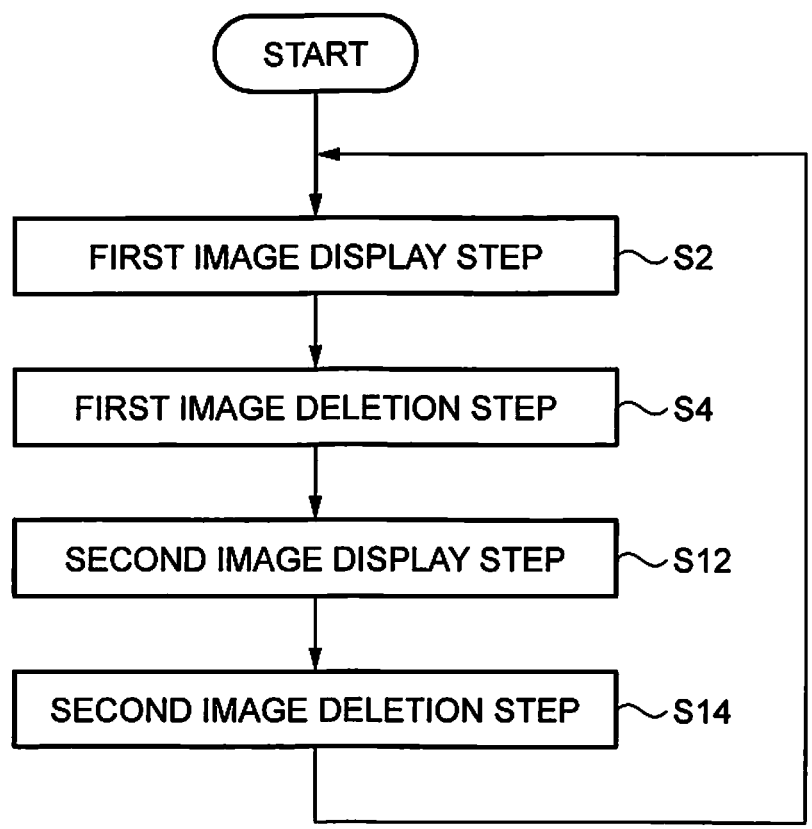
FIG. 9 is a flowchart in Comparative Example.

The flowchart in FIG. 9 shows control processes in Comparative Example that are carried out by the control section. The first image display step (S2) of displaying a first image (time display having odd number in one's digit of minute) in a first color (black, for example) is executed, as shown in FIG. 9. The first image deletion step (S4) of displaying the background of the first image in the first color to cause the entire display section to display the first color is then executed. Subsequently, the second image display step (S12) of displaying a second image (time display having even number in one's digit of minute) in a second color (white, for example) is executed. The second image deletion step (S14) of displaying the second image in the second color to cause the entire display section to display the second color is then executed. The second image deletion step (S14) is followed by the first image display step (S2) again.

Comparative Example, in which the DC balance is achieved based on the four steps described above, is suitable for an application in which a displayed image is to be updated (displayed and deleted) even number of times, such as time display.

1.7. Problems with Comparative Example

Figure 10A:
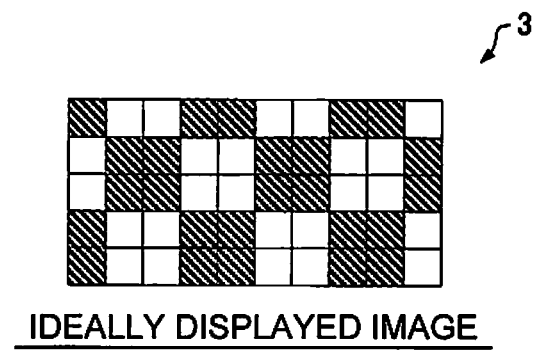
FIGS. 10A, 10B and 10C describe smearing in display operation in Comparative Example.
Figure 10B:
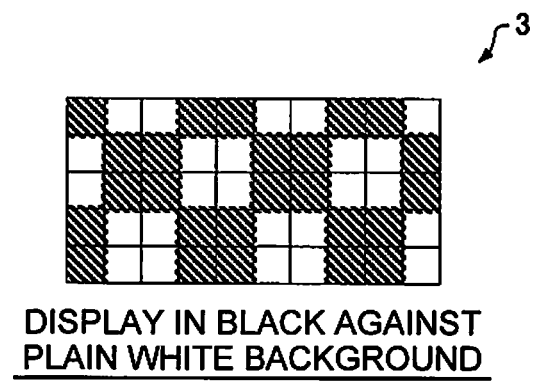
Figure 10C:
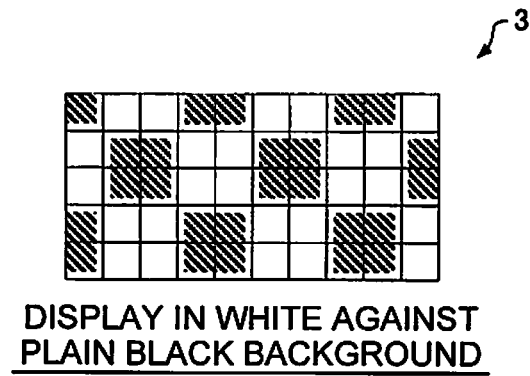

In the method for driving an electrophoretic display apparatus according to Comparative Example, however, the size and color tone of a displayed image is likely to vary. In the partial-screen drive method, in which only part of the display section is involved in drawing operation, the most recently driven color particles tend to spread due to en electric field in an oblique direction. As a result, when an image is displayed, for example, in the color of the most recently driven particles, the image is likely to be visually recognized as a smeared image (see FIGS. 8A and 8E). Further, when the background of an image is displayed, for example, in the color of the most recently driven particles, the image is likely to be visually recognized as a contracted image (see FIGS. 8C and 8G). FIGS. 10A to 10C describe the variations in the size and color tone with reference to a checkerboard pattern.

FIG. 10A shows the checkerboard pattern displayed with no smear. The displayed image shown in FIG. 10A is an ideal case both in the first and second image display steps. The first image display step, however, corresponds to display in black against a plain white background, such as the displayed mage shown in FIG. 10B, in which the display in black is smeared and appears enlarged. On the other hand, the second image display step corresponds to display in white against a plain black background, such as the displayed image shown in FIG. 10C, in which the display in white is smeared and appears enlarged. That is, the display in black (corresponding to second image) appears contracted. As a result, the same checkerboard pattern gives a viewer different impressions about the size and color tone.

Figure 11A:
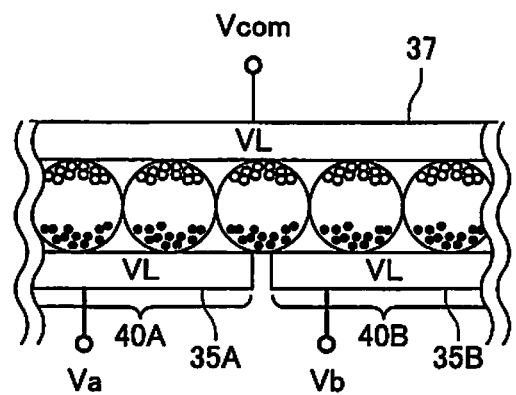
FIGS. 11A, 11B and 11C describe a cause of the smearing in Comparative Example.

The reason why the most recently driven color particles spread will next be described with reference to FIGS. 11A to 11C. The same elements as those in FIGS. 3B and 3C have the same reference characters and will not be described. FIG. 11A shows display in white with no electric field applied. Assume now that an electric field is then so applied by using the partial-screen drive method that the pixel 40A displays black and the pixel 40B keeps displaying white.

Figure 11B:
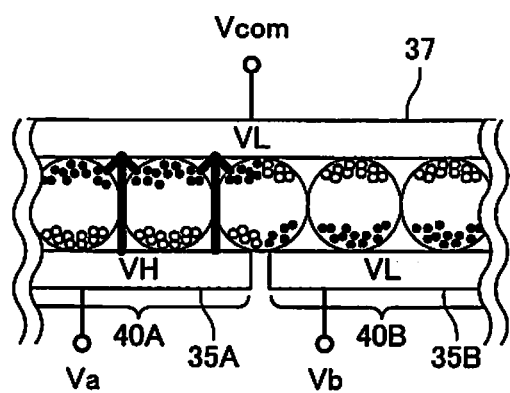
Figure 11C:
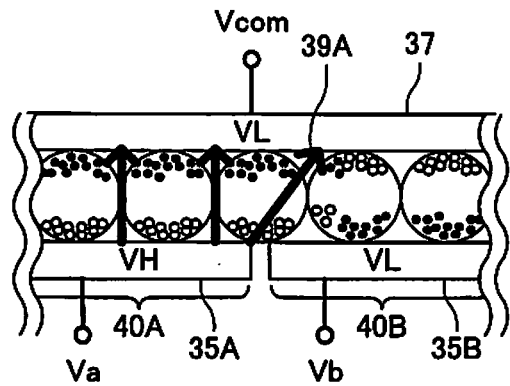

At this point, in an ideal case, an electric field passing through the pixel electrode 35A and the common electrode 37 in the direction perpendicular thereto is produced, whereby the displayed color changes from one side of the boundary between the pixel electrodes 35A and 35B to the other side, as shown in FIG. 11B. In practice, however, an electric field 39A from the pixel electrode 35A oriented in an oblique direction toward the common electrode 37 is produced, and the black particles in the adjacent pixel 40B are attracted toward the common electrode 37, as shown in FIG. 11C. The electric field in the oblique direction thus affects the most recently driven color particles in such a way that they spread, which may cause a viewer to visually recognize that the size and color tone of the displayed image vary.

As described above, in Comparative Example, no decrease in local contrast ratio or no full-screen-drive-method-specific afterimage will occur, but the problem of variations in the size and color tone of a displayed image is likely to occur. A method for driving an electrophoretic display apparatus according to the present embodiment to be described below further solves the problem with Comparative Example or the variations in the size and color tone of a displayed image.

1.8. Method for Driving Electrophoretic Display Apparatus in Present Embodiment A method for driving an electrophoretic display apparatus in the present embodiment will be described with reference to FIGS. 12 to 18. The same elements as those in FIGS. 1 to 11C have the same reference characters and will not be described.

FIG. 12 describes a method for solving the problem with Comparative Example or the variations in the size and other parameters of a displayed image. FIG. 12 shows a step of bringing any portion outside the pixel 40A (contour of first image, for example) that is partially displayed in black by the pixel 40B (background of first image, for example) back to be displayed in white. The step shown in FIG. 12, in which an electric field is applied to the pixel 40B in the direction opposite to the direction shown in FIG. 11C (so that the portion partially displayed in black is displayed in white), is executed after the step shown in FIG. 11C.

The step shown in FIG. 12 brings the size of a displayed image having spread back to an appropriate size but does not display a new image. The voltage-time product in the step shown in FIG. 12 may be smaller than that in the step shown in FIG. 11C. In the step shown in FIG. 12, another electric field 39B in an oblique direction is produced, but adjusting the voltage-time product avoids a counter drawback of causing the pixel 40A to partially display white.

The voltage-time product is a product of the voltage applied between the common electrode and a pixel electrode in question multiplied by the voltage application period. In other words, the voltage-time product is a time integral voltage applied between the common electrode and the pixel electrode.

In the present embodiment, adding a step of adjusting the size and other parameters of a displayed image (adjustment step) as shown in FIG. 12 can solve the problem with Comparative Example or the variations in the size and other parameters. Specifically, the first image display step and the second image display step are followed by a first image adjustment step and a second image adjustment step, each of which is an adjustment step, respectively.

FIGS. 13A to 13F show examples of display operation based on the method for driving an electrophoretic display apparatus in the present embodiment. A first image display step in FIG. 13A, a first image deletion step in FIG. 13C, a second image display step in FIG. 13D, and a second image deletion step in FIG. 13F are the same as those in Comparative Example. The first image display step and the second image display step are, however, followed by a first image adjustment step (FIG. 13B) and a second image adjustment step (FIG. 13E), in each of which the size and other parameters of a displayed image are adjusted, are added, respectively. Further, the first image deletion step and the second image deletion step are, for example, executed for a longer period than in Comparative Example in order to achieve the DC balance.

FIG. 13A shows an image displayed on the display section 3 and the driven pixels 13 used in the display operation after execution of the first image display step. FIG. 13A is the same as FIG. 8A in the description of Comparative Example and will not be described in order to avoid redundancy. It is assumed that the entire display section 3 displays white before the execution of the first image display step.

FIG. 13B shows an image displayed on the display section 3 and the driven pixels 13 used in the display operation after execution of the first image adjustment step. In the first image adjustment step, the portion other than the time display of 10:05 (corresponding to background of first image) is displayed in white (corresponding to second color) on the display section 3 by using the partial-screen drive method. In the first image adjustment step, the spread size of the time display of 10:05 displayed in the first image display step can be brought back into an appropriate size.

FIGS. 13C and 13D show images displayed on the display section 3 and the driven pixels 13 used in the display operation after execution of the first image deletion step. FIGS. 13C and 13D are the same as FIGS. 8B and 8C in the description of Comparative Example and will not be described in order to avoid redundancy.

FIG. 13E shows an image displayed on the display section 3 and the driven pixels 13 used in the display operation after execution of the second image adjustment step. In the second image adjustment step, time display of 10:06 (corresponding to second image) is displayed in black (corresponding to first color) by using the partial-screen drive method. In the first image adjustment step, the contracted size of the time display of 10:06 displayed in the second image display step can be brought back to an appropriate size.

FIG. 13F shows an image displayed on the display section 3 and the driven pixels 13 used in the display operation after execution of the second image deletion step. FIG. 13F is the same as FIG. 8D in the description of Comparative Example and will not be described. The execution of the second image deletion step is followed by the first image display step (not shown) again and the steps described above are repeated in the same manner. In this example, the first image in the following first image display step is time display of 10:07.

The steps described above are all executed by using the partial-screen drive method as in Comparative Example, whereby no afterimage that occurs when the period required to update a displayed image is shortened in the full-screen drive method (full-screen-drive-method-specific afterimage) will occur. Further, since the adjustment steps are added, the problem with Comparative Example or the variations in the size and other parameters can be solved.

It is necessary to achieve the DC balance as a whole also in the method for driving an electrophoretic display apparatus according to the present embodiment. In Comparative Example, the DC balance is achieved based on four steps (first image display step, first image deletion step, second image display step, and second image deletion step), as described above. In the present embodiment, which includes the first image adjustment step and the second image adjustment step, unlike Comparative Example, it is necessary to achieve the DC balance in consideration of the applied electric field in the added steps.

In the first image adjustment step, the background of the first image is displayed in the second color, and in the second image adjustment step, the second image is displayed in the first color. On the other hand, in the first image deletion step, the background of the first image is displayed in the first color, and in the second image deletion step, the second image is displayed in the second color. Therefore, the first image adjustment step and the first image deletion step allow the DC balance to be achieved, and the second image adjustment step and the second image deletion step allow the DC balance to be achieved. That is, the DC balance can be achieved as a whole, for example, by extending the execution period of each of the first image deletion step and the second image deletion step.

Figure 14:
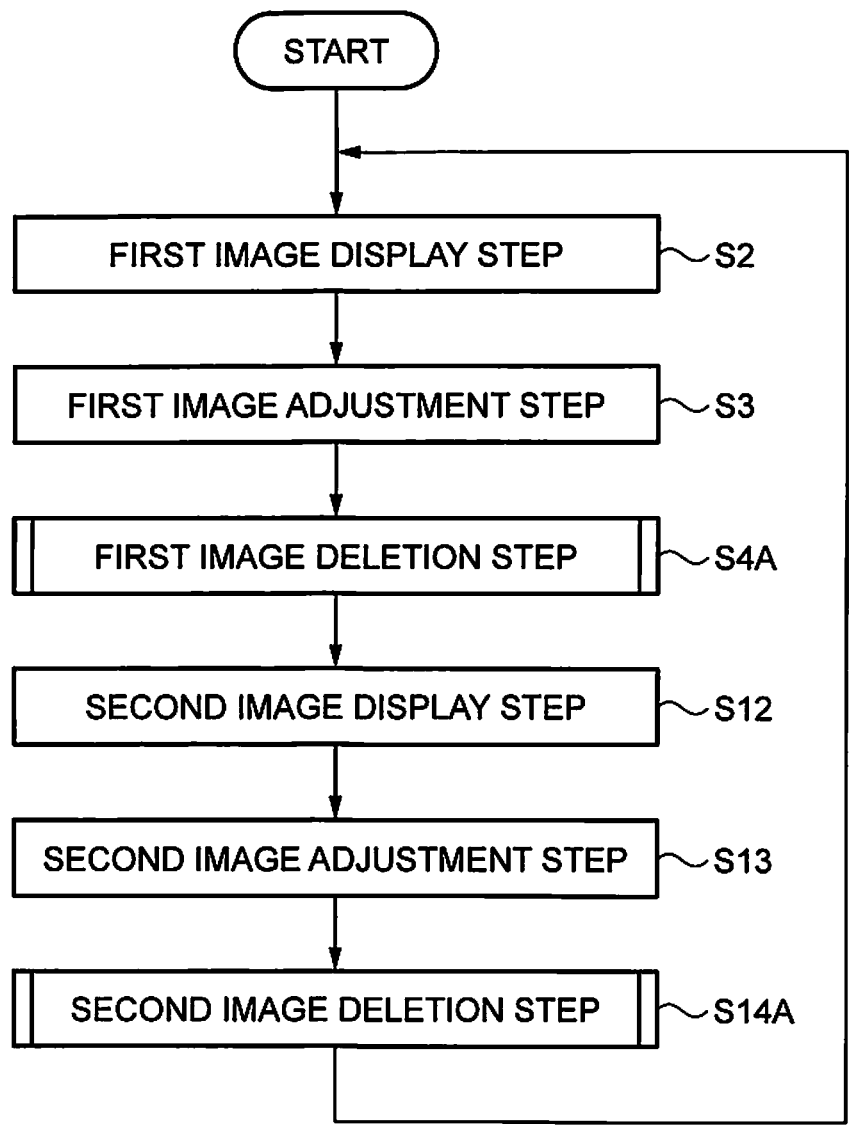
FIG. 14 is a flowchart in the first embodiment.
Figures 15A, 15B:
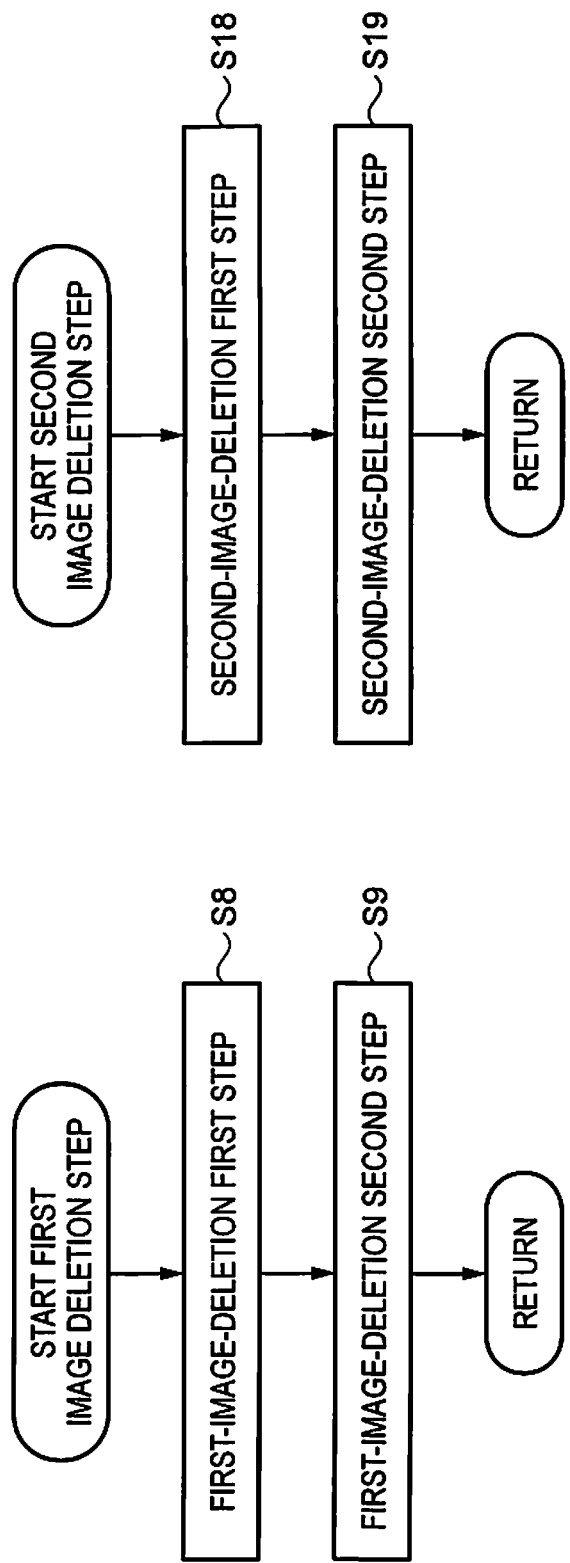
FIGS. 15A and 15B are flowcharts of subroutines.

FIGS. 14 to 15B are flowcharts of the procedure of the steps in this case. The same steps as those in FIG. 9 in Comparative Example have the same reference characters. As shown in FIG. 14, the first image display step (S2) of displaying the first image (time display having odd number in one's digit of minute) in the first color (black, for example) is first executed.

The first image adjustment step (S3) of displaying the background of the first image in the second color is then executed, and the first image deletion step (S4A) of displaying the background of the first image in the first color to cause the entire display section to display the first color is then executed.

The first image deletion step (S4A) is executed for a longer period than the first image deletion step in Comparative Example (S4 in FIG. 9) and is formed of two sub-steps. The two sub-steps are a first-image-deletion first step S8 and a first-image-deletion second step S9 shown in FIG. 15A. The first-image-deletion first step S8 and the first-image-deletion second step S9, in each of which the background of the first image is displayed in the first color, are two separate steps from the viewpoint of the DC balance. The voltage-time product in the first-image-deletion first step S8 is equal to the voltage-time product in the first image display step S2. Further, the sum of the voltage-time product in the first-image-deletion second step S9 and the voltage-time product in the first image adjustment step S3 is zero.

The description with reference to FIG. 14 will resume. After the first image deletion step (S4A), the second image display step (S12) of displaying the background of the second image (time display having even number in one's digit of minute) in the second color is executed.

The second image adjustment step (S13) of displaying the second image in the first color is then executed, and the second image deletion step (S14A) of displaying the second image in the second color to cause the entire display section to display the second color is subsequently executed. The second image deletion step (S14A) is followed by the first image display step (S2) again.

The second image deletion step (S14A) is executed for a longer period than the second image deletion step in Comparative Example (S14 in FIG. 9) and is formed of two sub-steps. The two sub-steps are a second-image-deletion first step S18 and a second-image-deletion second step S19 shown in FIG. 15B. The second-image-deletion first step S18 and the second-image-deletion second step S19, in each of which the second image is displayed in the second color, are two separate steps from the viewpoint of the DC balance. The voltage-time product of the second-image-deletion first step S18 is equal to the voltage-time product in the second image display step S12. Further, the sum of the voltage-time product in the second-image-deletion second step S19 and the voltage-time product in the second image adjustment step S13 is zero.

FIGS. 16A to 16H show examples of display operation performed in a step procedure in which each of the first image deletion step and the second image deletion step is replaced with the sub-steps. The same elements as those in FIGS. 13A to 13F have the same reference characters, and only different portions will be described to avoid redundancy.

Figure 16A:
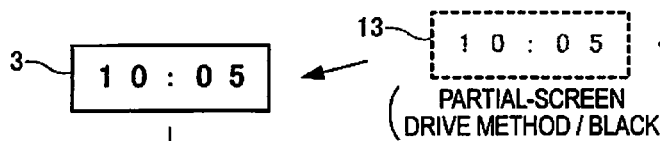
FIGS. 16A, 16B, 16C, 16D, 16E, 16F, 16G and 16H show examples of display operation performed in a step procedure in which each of a first image deletion step and a second image deletion step is divided into sub-steps.
Figure 16B:
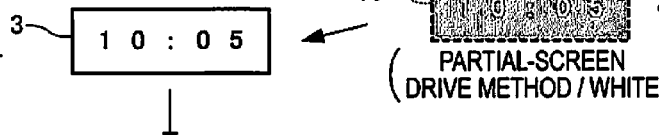
Figure 16C:
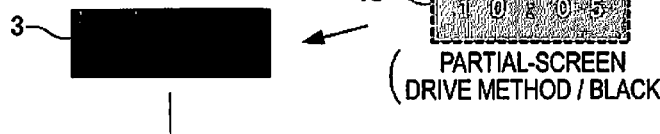
Figure 16D:
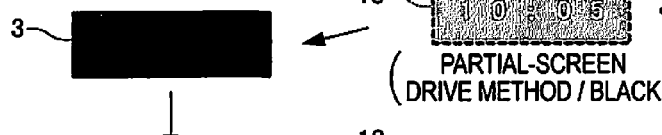
Figure 16E:
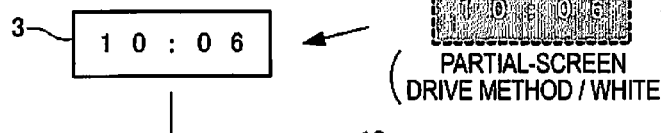
Figure 16F:
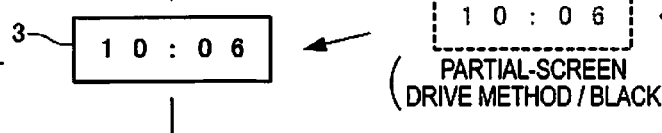
Figure 16G:
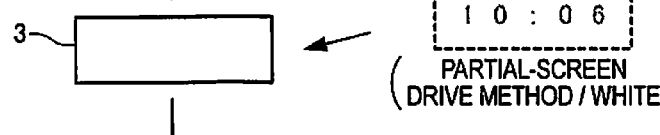
Figure 16H:
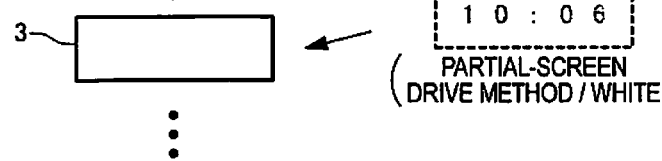

The first image deletion step (see FIG. 13C) is divided into the first-image-deletion first step in FIG. 16C and the first-image-deletion second step in FIG. 16D. In each of the two steps, the entire screen is displayed in black. Further, the second image deletion step (see FIG. 13F) is divided into the second-image-deletion first step in FIG. 16G and the second-image-deletion second step in FIG. 16H. In each of the two steps, the entire screen is displayed in white.

As in Comparative Example, the DC balance is achieved based on four steps, the first image display step (FIG. 16A), the first-image-deletion first step (FIG. 16C), the second image display step (FIG. 16E), and the second-image-deletion first step (FIG. 16G) (group g0). Further, the first image adjustment step (FIG. 16B) and the first-image-deletion second step (FIG. 16D) allow the DC balance to be achieved (group g1), and the second image adjustment step (FIG. 16F) and the second-image-deletion second step (FIG. 16H) allow the DC balance to be achieved (group g2). The method for driving an electrophoretic display apparatus according to the present embodiment also allows the DC balance to be achieved as a whole.

Figure 17:
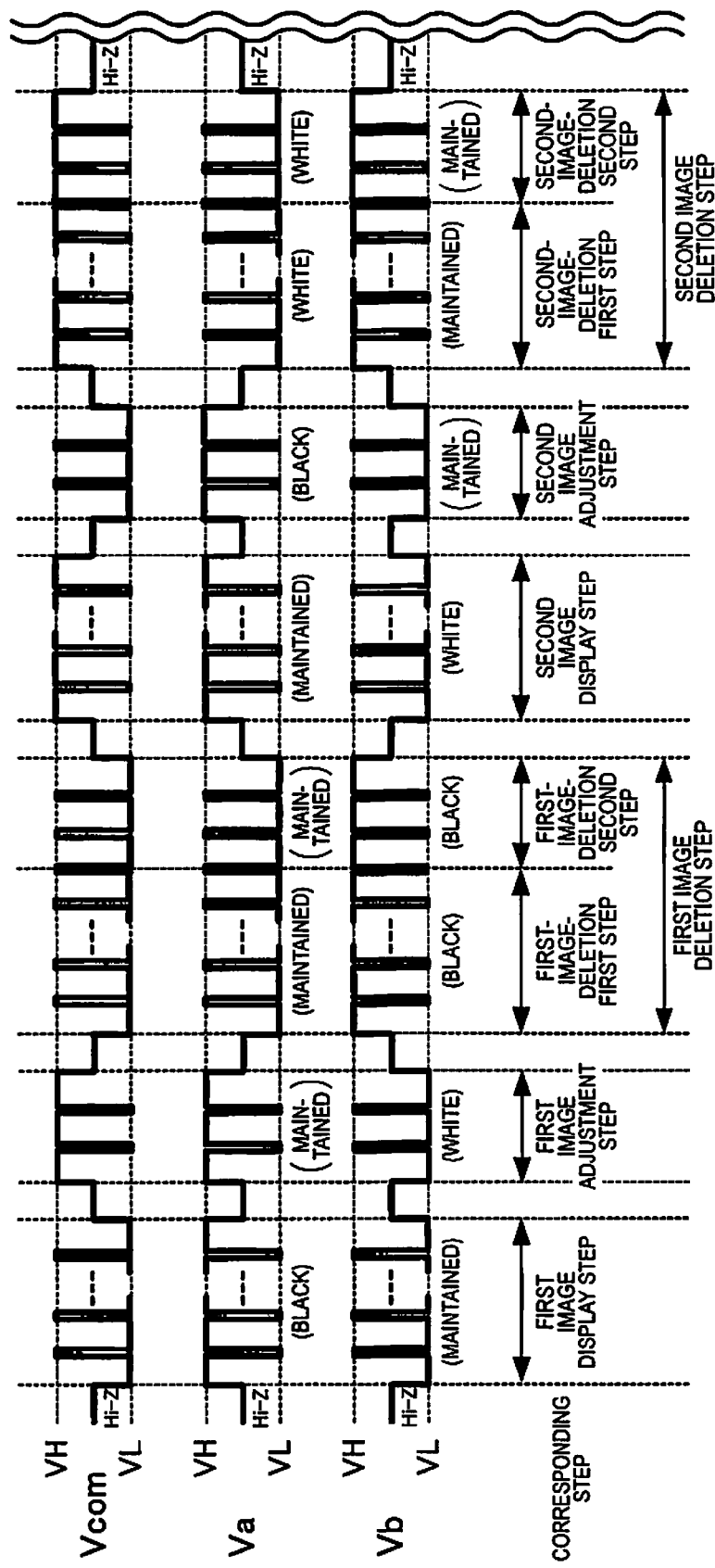
FIG. 17 is a waveform diagram in the first embodiment.

FIG. 17 shows an exemplary waveform diagram in the present embodiment. The same elements as those in FIGS. 1 to 16H have the same reference characters and will not be described. The corresponding steps in FIG. 17 are the same as those in FIGS. 16A to 16H. In this example, the pixel 40A, in which the potential Va is applied to the pixel electrode, is assumed to be one of the pixels that form the first image and the second image. Further, the pixel 40B, in which the potential Vb is applied to the pixel electrode, is assumed to be one of the pixels that form the background of the first image and the background of the second image.

For example, in the first image display step, the first image is displayed in black (see Va in FIG. 17), and the background of the first image is maintained to be white (see Vb in FIG. 17). Further, for example, in the first image adjustment step, the background of the first image is displayed in white (see Vb in FIG. 17), and the first image is maintained to be black (see Va in FIG. 17).

The method for driving an electrophoretic display apparatus in the present embodiment, which includes the two adjustment steps, reduces variations in the size and color tone of a displayed image. To this end, an electric field only needs to be applied for a period long enough to eliminate a smeared or contracted portion of the displayed image in each of the adjustment steps. That is, the first image adjustment step and the second image adjustment step may be executed for shorter periods than the first image display step and the second image display step executed before the respective adjustment steps.

In these steps, to achieve the DC balance, for example, the execution period of the first image display step is preferably equal to the execution period of the second image display step. Further, the execution period of the first image adjustment step is preferably equal to the execution period of the second image adjustment step. In FIG. 17, the first image display step, the second image display step, the first-image-deletion first step, and the second-image-deletion first step have the same execution period, and the DC balance is achieved based on the four steps (see group g0 in FIG. 16).

Further, in FIG. 17, the steps other than those that belong to the group g0 in FIG. 16 have the same execution period that is shorter than the execution period of the steps that belong to the group g0 in FIG. 16. As shown in the waveform diagram of FIG. 17, executing the adjustment steps (first image adjustment step and second image adjustment step) for a period shorter than the execution period of the image display steps (first image display step and second image display step) prevents a problem of a significant increase in the period required to update a displayed image even when the adjustment steps are added. Further, when the voltage in each of the adjustment steps can be lowered, an increase in power consumption due to the added adjustment steps can be reduced.

Figure 18:
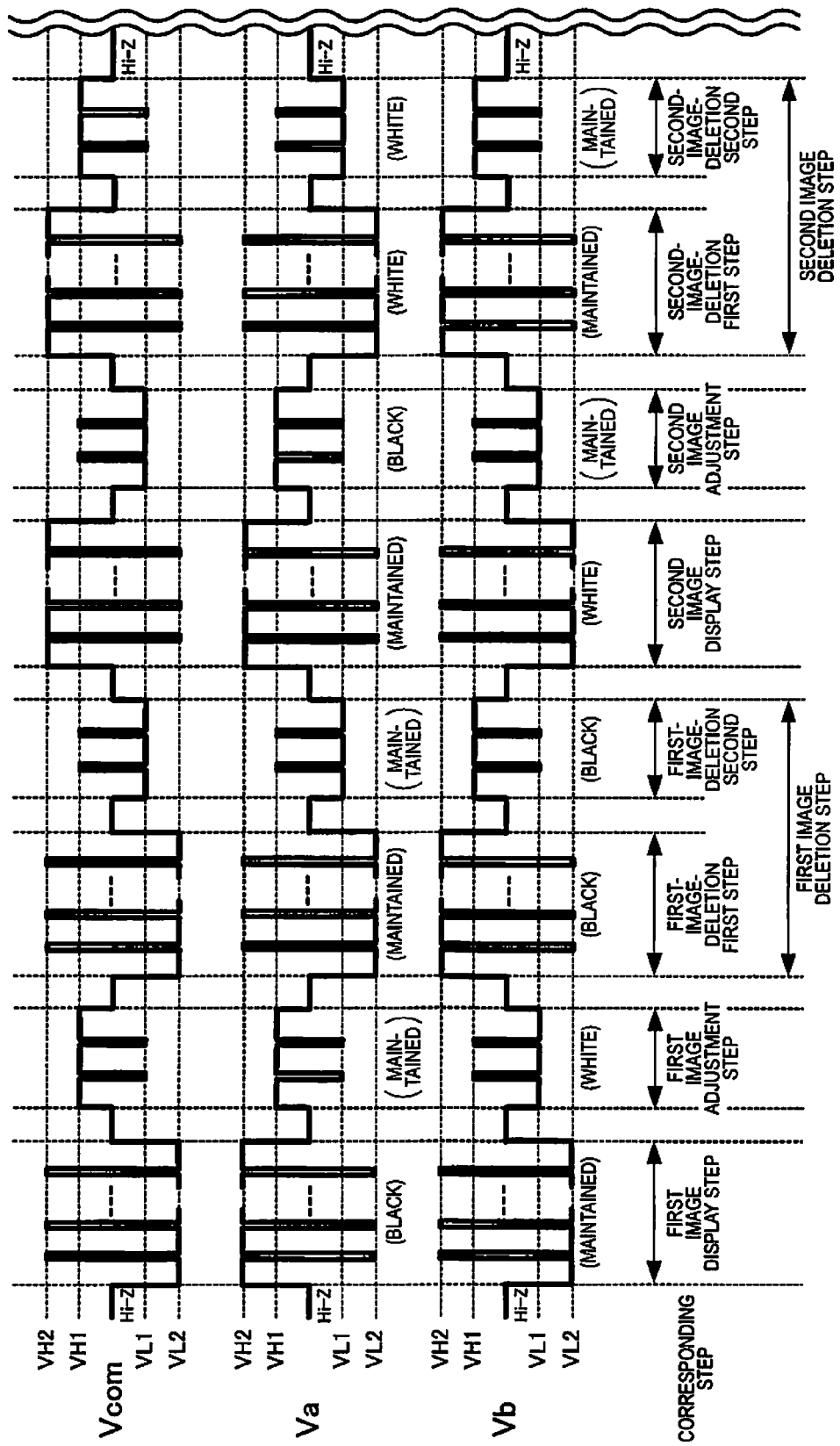
FIG. 18 is another waveform diagram in the first embodiment.

FIG. 18 shows a case where the applied voltages in the adjustment steps differ from, for example, those in the first and second image display steps. In the adjustment steps, the applied voltages are set at VL1 and VH1, whereas in the first and second image display steps, the applied voltages are set at VL2 and VH2. It is assumed in this case that the following relationships are satisfied: VL2<VL1; VH1<VH2; and |VH1−VL1|<|VH2−VL2|.

In the case shown in FIG. 18, the DC balance can be achieved as well, for example, by setting the voltage-time product in the first-image-deletion first step to be equal to the voltage-time product in the first image display step and setting the voltage-time product in the first-image-deletion second step and the voltage-time product in the first image adjustment step to cancel each other.

In FIGS. 17 to 18, in which the first-image-deletion first step, which is one of the sub-steps of the first image deletion step, is first executed, the first-image-deletion second step may first be executed.

As described above, the method for driving an electrophoretic display apparatus according to the present embodiment, which includes the steps of adjusting the size and other parameters of a displayed image (adjustment steps) while achieving the DC balance, can solve the problem with Comparative Example or the variations in the size and other parameters.

2. Second Embodiment

Figure 19:
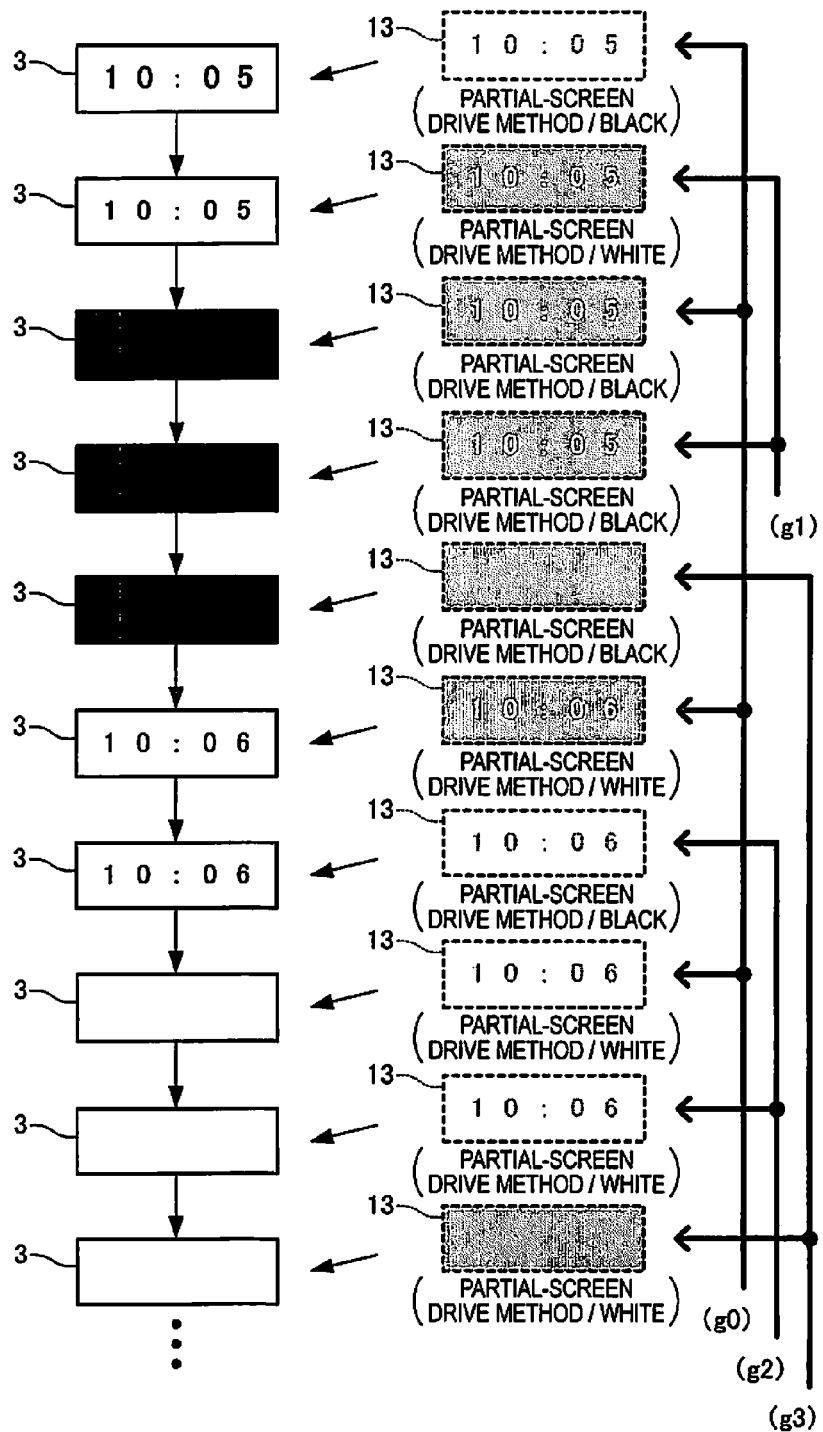
FIGS. 19A, 19B, 19C, 19D, 19E, 19F, 19G, 19H, 19I and 19J show examples of display operation in a second embodiment.

A second embodiment of the invention will be described with reference to FIGS. 19A to 20. The second embodiment is the same as the first embodiment (see FIG. 1) in terms of the configuration of the electrophoretic display apparatus but differs therefrom in terms of the drive method in part. The same elements as those in FIGS. 1 to 18 have the same reference characters and will not be described.

2.1. Pattern Boundary Line

The first embodiment, to prevent a decrease in local contrast ratio, includes the step of driving a first image (or second image) and the step of driving the background of the first image (or background of second image). To solve a problem with an electrophoretic display apparatus, specifically, the situation in which the most recently driven color particles among the electrophoretic particles spread so that the size and other parameters of a displayed image vary, the adjustment steps are executed in the first embodiment to reduce the variations.

When the same display operation is repeated, however, a slight amount of specific color particles are left along the contour of a displayed image, and a boundary line produced along the contour (pattern boundary line) is likely to be visually recognized in long-term use. In the second embodiment, in case such a pattern boundary line occurs, the pattern boundary line can be less visible, whereby the display quality can be improved.

2.2. Examples of Display Operation in Present Embodiment

FIGS. 19A to 19J show examples of display operation in the present embodiment. The names of steps in FIGS. 19A to 19J correspond to the names of steps in the flowchart described later. To avoid redundant description, only steps different from those in FIGS. 16A to 16H will be described.

The present embodiment includes a first single-color display step of causing all the pixels of the display section 3 to display black (corresponding to first color) as shown in FIG. 19E and a second single-color display step of causing all the pixels of the display section 3 to display white (corresponding to second color) as shown in FIG. 19J. The steps in FIGS. 19A to 19D are the same as those in FIGS. 16A to 16D and will not therefore be described. Further, the steps in FIGS. 19F to 19I are the same as those in FIGS. 16E to 16H and will not therefore be described.

The first single-color display step in FIG. 19E follows the first-image-deletion second step in FIG. 19D and causes all the pixels of the display section 3 to display black by using the partial-screen drive method. The first single-color display step can make a pattern boundary line that is likely to occur in the first-image-deletion second step in FIG. 19D less visible.

Further, the second single-color display step in FIG. 19J follows the second-image-deletion second step in FIG. 19I and causes all the pixels of the display section 3 to display white by using the partial-screen drive method. The second single-color display step can make a pattern boundary line that is likely to occur in the second-image-deletion second step in FIG. 19I less visible.

In the method for driving an electrophoretic display apparatus according to the present embodiment, which includes the first single-color display step and the second single-color display step, even when a boundary line occurs along the contour of the first image or the second image (pattern boundary line), the pattern boundary line can be made less visible. Further, in the method for driving an electrophoretic display apparatus according to the present embodiment, the DC balance is achieved based on the first single-color display step and the second single-color display step (group g3). Since the DC balance has been already achieved in the groups g0 to g2 as described above, the DC balance is achieved as a whole.

2.3. Flowchart

Figure 20:
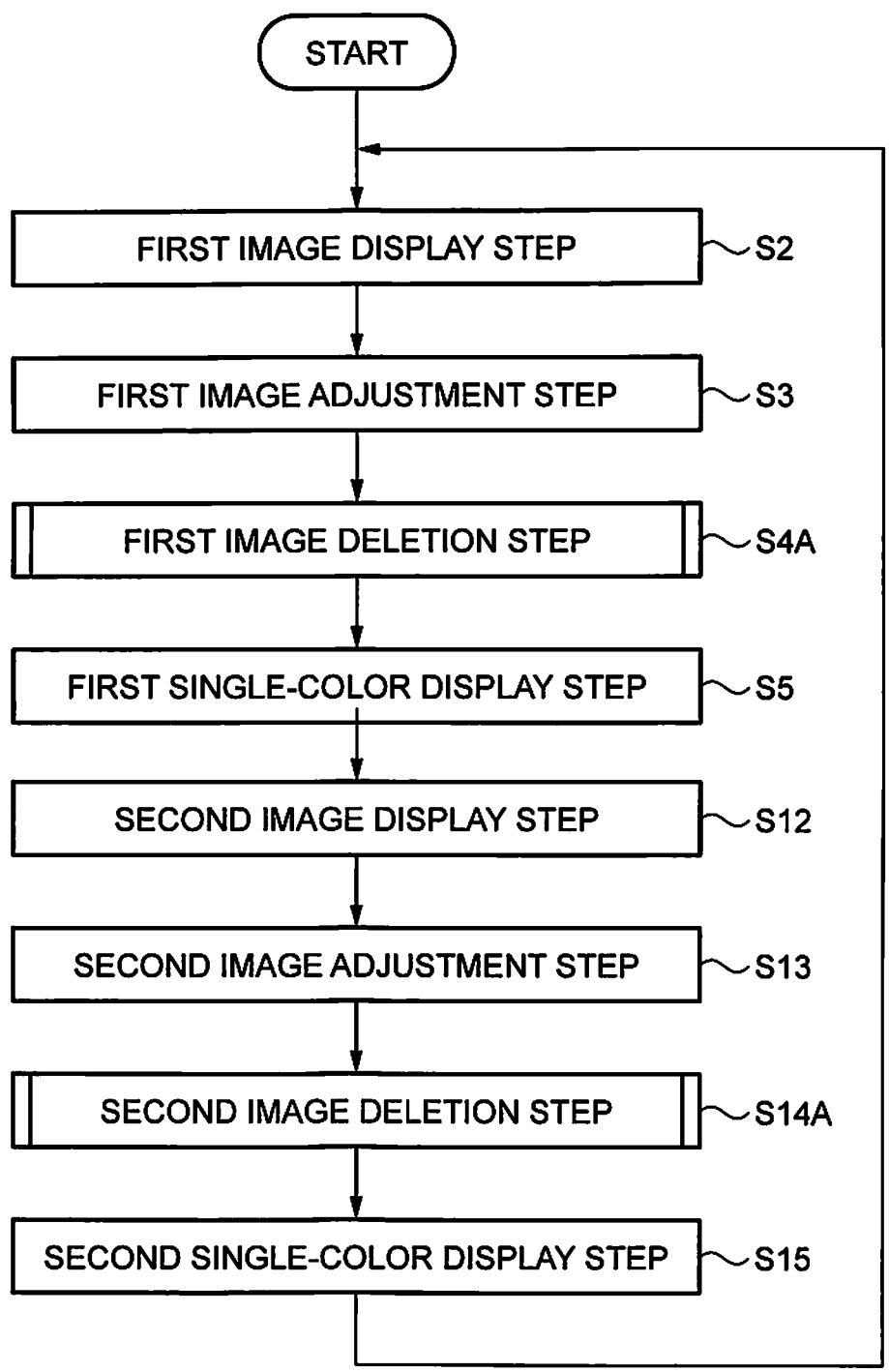
FIG. 20 is a flowchart in the second embodiment.

The flowchart in FIG. 20 shows control processes carried out by a control section in the electrophoretic display apparatus according to the present embodiment. The same steps as those in FIG. 14 have the same reference characters and will not be described in detail.

In the present embodiment, the first image display step (S2) of displaying the first image in the first color is first executed. The first image adjustment step (S3) of displaying the background of the first image in the second color and the first image deletion step (S4A) of displaying the background of the first image in the first color to cause the entire display section to display the first color are subsequently executed. However, in the first image deletion step (S4A), for example, a pattern boundary line is likely to occur. To make the pattern boundary line less visible, the first single-color display step of causing the entire display section to display the first color is subsequently executed (S5). In the present embodiment, the entire display section is caused to display the first color by using the partial-screen drive method.

The second image display step (S12) of displaying the background of the second image in the second color is then executed. The second image adjustment step (S13) of displaying the second image in the first color and the second image deletion step (S14A) of displaying the second image in the second color to cause the entire display section to display the second color are subsequently executed. However, in the second image deletion step (S14A), for example, a pattern boundary line is likely to occur. To make the pattern boundary line less visible, the second single-color display step of causing the entire display section to display the second color is subsequently executed (S15). In the present embodiment, the entire display section is caused to display the second color by using the partial-screen drive method. The second single-color display step (S15) is followed by the first image display step (S2) again.

The sub-steps of the first image deletion step (S4A) and the second image deletion step (S14A) are the same as those in the first embodiment and will not therefore be described (see FIGS. 15A and 15B).

The electrophoretic display apparatus according to the present embodiment is suitable for an application in which a displayed image is to be updated (displayed and deleted) even number of times, such as time display.

3. Application Examples

Application examples of the invention will be described with reference to FIGS. 21 to 22B. The same elements as those in FIGS. 1 to 20 have the same reference characters and will not be described. The electrophoretic display apparatus in the first and second embodiments are applicable to an electronic apparatus, such as an electronic timepiece that displays time.

3.1. Block Diagram of Electronic Apparatus

Figure 21:
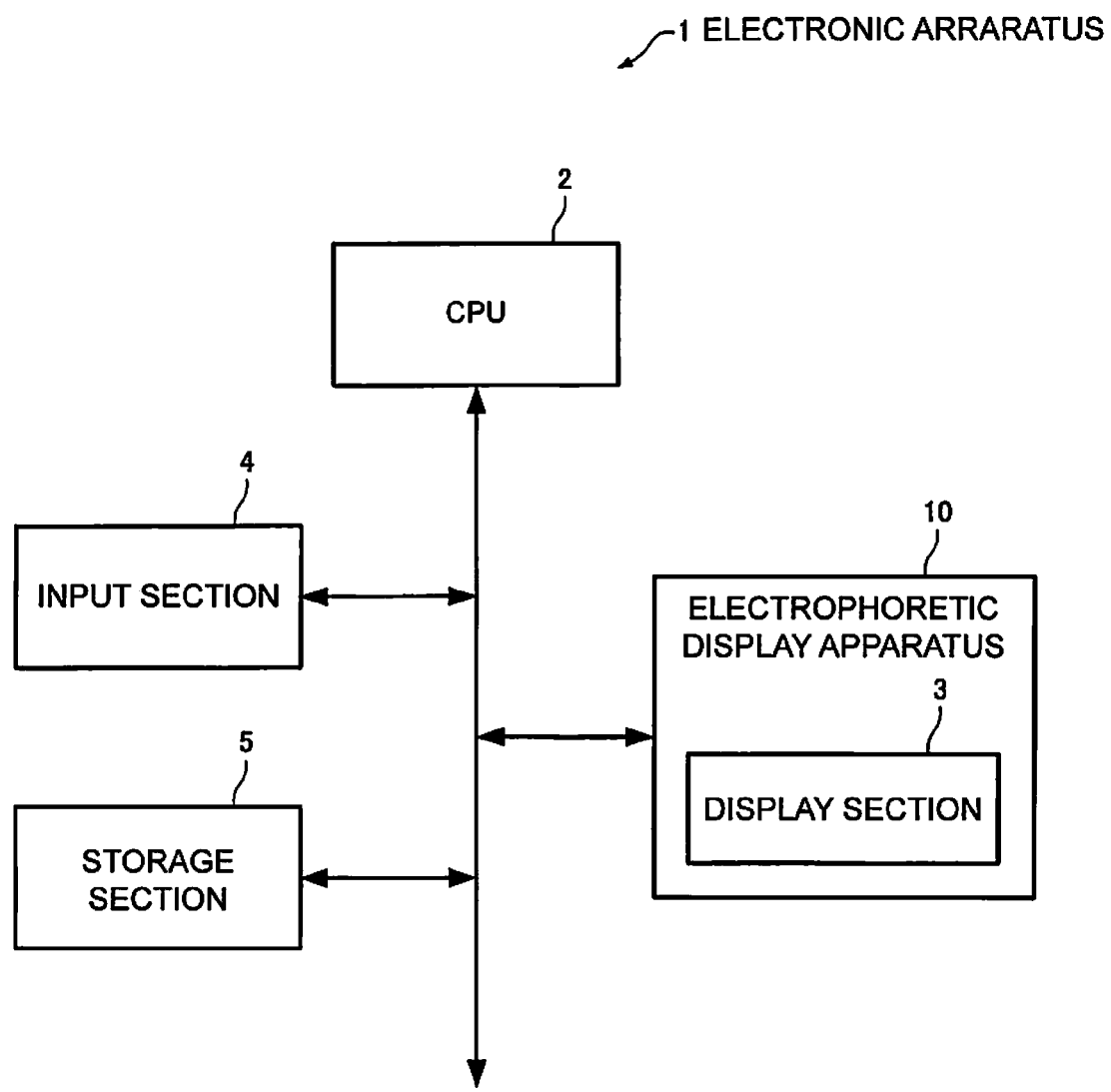
FIG. 21 is a block diagram of an electronic apparatus according an application example.

FIG. 21 is a block diagram of an electronic apparatus 1 according an application example. The electronic apparatus 1 includes a CPU 2, an input section 4, a storage section 5, and an electrophoretic display apparatus 10. The electrophoretic display apparatus 10 is the electrophoretic display apparatus according to the first or second embodiment and includes a display section 3, which displays a variety of images.

The CPU 2 controls the other blocks for a variety of computation and processing. The CPU 2 may read a program, for example, from the storage section 5 and input a time signal and other signals to the electrophoretic display apparatus 10 in accordance with the program.

The input section 4 may receive, for example, an instruction from a user of the electronic apparatus 1 and output a signal according to the instruction to the other blocks.

The storage section 5 may, for example, be a DRAM, an SRAM, or any other memory and may include a ROM. The program used by the CPU 2 may, for example, be written in the ROM provided in the storage section 5.

The display section 3 may be part of the electrophoretic display apparatus 10 and display time, a character, a photograph, and other types of information.

The electronic apparatus 1, which includes the electrophoretic display apparatus 10 according to the first or second embodiment, can not only achieve the DC balance of a displayed image but also reduce a decrease in local contrast ratio and variations in the size and color tone of the displayed image. As a result, an electronic apparatus that excels in long-term reliability and provides good display quality can be achieved.

3.2. Specific Examples of Electronic Apparatus

Figure 22A:
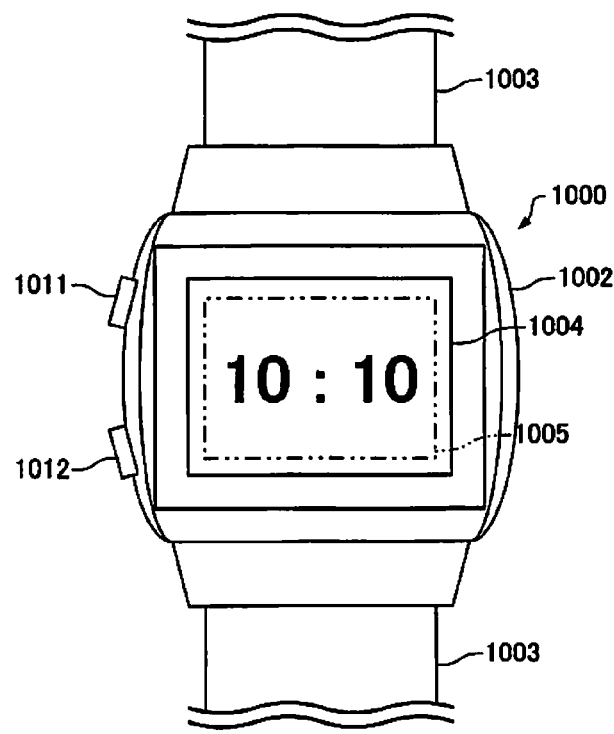
FIG. 22A shows an electronic timepiece that is an example of an electronic apparatus.
Figure 22B:
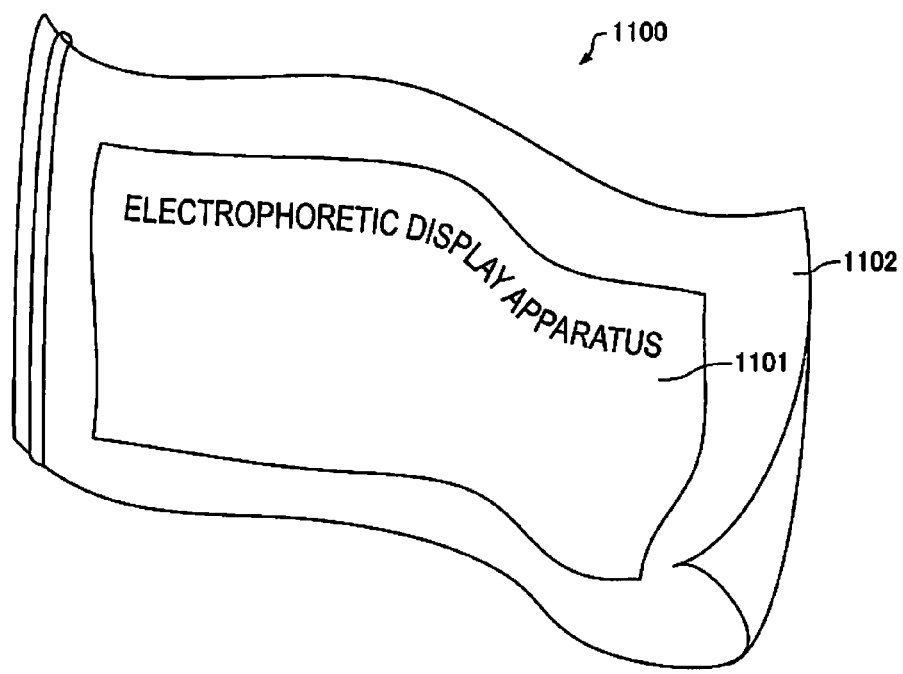
FIG. 22B shows an electronic paper sheet that is an example of an electronic apparatus.

FIGS. 22A and 22B show specific examples of the electronic apparatus. FIG. 22A is a front view of an electronic timepiece 1000, which is an electronic apparatus. The electronic timepiece 1000 is, for example, a wristwatch and includes a timepiece case 1002 and a pair of bands 1003 connected to the timepiece case 1002. A display section 1004, which is the display section 3 (see FIG. 21) of the electrophoretic display apparatus 10, is provided on the front side of the timepiece case 1002 and performs time display action 1005. Two operation buttons 1011 and 1012 are provided on the side surface of the timepiece case and function as the input section 4 (see FIG. 21).

Further, for example, FIG. 22B is a perspective view of an electronic paper sheet 1100, which is an electronic apparatus. The electronic paper sheet 1100 is flexible and includes a display area 1101, which is the display section 3 (see FIG. 21) of the electrophoretic display apparatus 10, and a body 1102.

The electrophoretic display apparatus according to the first and second embodiments are applicable to a variety of electronic apparatus including the specific examples described above. In such an electronic apparatus, long-term reliability of the display section can be ensured because the DC balance is achieved, and display quality can be improved because a decrease in local contrast ratio and variations in the size and color tone of a displayed image are suppressed.

4. Others

In the second embodiment, the partial-screen drive method is used even to cause all the pixels of the display section to display a single color. In this case, however, the full-screen drive method may alternatively be used. Specifically, in the second embodiment, the first single-color display step and the second single-color display step may be executed by using the full-screen drive method to cause all the pixels of the display section to display the first and second colors.

In the embodiments described above, the electrophoretic display apparatus does not necessarily rely on black-and-white dual particle-based electrophoresis using black and white particles and may rely on single particle-based electrophoresis using, for example, blue or white particles or may rely on a combination of colors other than black and white.

The drive method described above is not necessarily applied to an electrophoretic display apparatus and may be applied to a display unit having a memory capability, such as an ECD (electrochromic display), a ferroelectric liquid crystal display, and a cholesteric liquid crystal display.

Further, the electronic timepiece according to the application example described above is not limited to a wristwatch and may be a desktop clock, a wall clock, a pocket watch, and a wide variety of other apparatus having a timepiece function.

The invention is not limited to the examples described above, and the scope of the invention encompasses substantially the same configurations as the configurations described in the above embodiments (for example, a configuration having the same function, using the same method, and providing the same result or a configuration having the same purpose and providing the same effect). Further, the scope of the invention encompasses a configuration in which an inessential portion of the configuration described in the above embodiments is replaced. Moreover, the scope of the invention encompasses a configuration that provides the same advantageous effect as that provided in the configurations described in the above embodiments or a configuration that can achieve the same purpose as that achieved by the configurations described in the above embodiments. Further, the scope of the invention encompasses a configuration in which a known technology is added to the configuration described in any of the above embodiments.

The invention claimed is:

1. A method for driving an electrophoretic display apparatus including a display section having the following components: a pair of substrates that sandwich an electrophoretic device containing electrophoretic particles; pixels capable of displaying at least a first color and a second color; a pixel electrode corresponding to each of the pixels and formed between one of the substrates and the electrophoretic device; and a common electrode facing the plurality of pixel electrodes and formed between the other substrate and the electrophoretic device, the method comprising:

a first image display step of displaying a first image in the first color on the display section by using a partial-screen drive method for applying a voltage based on a drive pulse signal that repeats a first potential and a second potential to the common electrode and applying a voltage based on a reversal signal or a normal signal of the drive pulse signal to each of the plurality of pixel electrodes to produce an electric field between the pixel electrode and the common electrode so that the electrophoretic particles are moved to redraw an image displayed on the display section;

a first image adjustment step of displaying a background of the first image in the second color on the display section by using the partial-screen drive method after the first image display step;

a first image deletion step of displaying the background of the first image in the first color on the display section by using the partial-screen drive method after the first image adjustment step;

a second image display step of displaying a background of a second image in the second color on the display section by using the partial-screen drive method after the first image deletion step; and a second image adjustment step of displaying the second image in the first color on the display section by using the partial-screen drive method after the second image display step, wherein the second image adjustment step is followed by a second image deletion step of displaying the second image in the second color on the display section by using the partial-screen drive method, and after the second image deletion step, the following first image display step is executed.

2. The method for driving an electrophoretic display apparatus according to claim 1, wherein the first image deletion step includes
a first-image-deletion first step of displaying the background of the first image in the first color in such a way that a voltage-time product in the first-image-deletion first step is equal to the voltage-time product in the first image display step, the voltage-time product being a product of a voltage applied between the common electrode and each of the pixel electrodes multiplied by a voltage application period, and
a first-image-deletion second step of displaying the background of the first image in the first color in such a way that the sum of the voltage-time product in the first-image-deletion second step and the voltage-time product in the first image adjustment step is zero, and the second image deletion step includes
a second-image-deletion first step of displaying the second image in the second color in such a way that the voltage-time product in the second-image-deletion first step is equal to the voltage-time product in the second image display step, and
a second-image-deletion second step of displaying the second image in the second color in such a way that the sum of the voltage-time product in the second-image-deletion second step and the voltage-time product in the second image adjustment step is zero.

3. The method for driving an electrophoretic display apparatus according to claim 1, wherein
the voltage-time product in the first image adjustment step is smaller than the voltage-time product in the first image display step, and
the voltage-time product in the second image adjustment step is smaller than the voltage-time product in the second image display step.

4. The method for driving an electrophoretic display apparatus according to claim 1, wherein
after the first image deletion step and before the second image display step, a first single-color display step of causing all the pixels of the display section to display the first color is added, and
after the second image deletion step and before the following first image display step, a second single-color display step of causing all the pixels of the display section to display the second color is added.

5. An electrophoretic display apparatus comprising
a control section that executes the method for driving an electrophoretic display apparatus according to claim 1.

6. An electronic apparatus comprising the electrophoretic display apparatus according to claim 5.

7. An electronic timepiece comprising the electrophoretic display apparatus according to claim 5.

* * * * *